United States Patent [19]

Prengaman et al.

[11] Patent Number: 4,550,318

[45] Date of Patent: Oct. 29, 1985

[54] RETROSPECTIVE DATA FILTER

[75] Inventors: Richard J. Prengaman, Severna Park; Robert E. Thurber, Silver Spring; Joe Phipps, Westminster, all of Md.; Ronald I. Greenberg, Clayton, Mo.; Wai L. Hom, Washington, D.C.; James F. Jaworski; Guy W. Riffle, both of Columbia, Md.

[73] Assignee: The Johns Hopkins University, Baltimore, Md.

[21] Appl. No.: 345,325

[22] Filed: Feb. 3, 1982

[51] Int. Cl.$^4$ ............................................. G01S 13/04
[52] U.S. Cl. .................................................. 343/5 PD
[58] Field of Search ................. 343/5 R, 5 CE, 5 CF, 343/5 PD, 7.7, 8, 5 DP, 7 A, 7.3; 367/124

[56] References Cited

U.S. PATENT DOCUMENTS

| | | | |
|---|---|---|---|
| 3,325,806 | 6/1967 | Wilmot et al. | 343/5 R |
| 3,353,177 | 11/1967 | Wilmot | 343/5 R |
| 3,699,573 | 10/1972 | Andrews et al. | 343/7 A |
| 4,005,415 | 1/1977 | Kossiakoff et al. | 343/7 A |
| 4,205,382 | 5/1980 | Buscher et al. | 343/5 PD |
| 4,319,332 | 3/1982 | Mehnert | 343/5 PD |

Primary Examiner—Salvatore Cangialosi
Assistant Examiner—K. R. Kaiser
Attorney, Agent, or Firm—Robert E. Archibald; Leonard W. Pojunas

[57] ABSTRACT

In a target detection communication system, apparatus and method for determining the presence of probable targets based on contacts (which can indicate the presence of a target, noise, chatter, or objects not of interest) detected within a predefined position sector or sectors over a specified number of scans. The position of each detected contact, as a contact of interest, is compared with the positions of contacts detected at previous times or scans. Velocity profiles indicate which previous contacts support the likelihood that the contact of interest represents a target having a velocity within a defined band. The likelihood, which can be represented by a quality value, may be a function of number of contacts, timing of contacts, or both the number and timing of contacts in a given velocity profile. A preselected threshold value, which is related to false alarm rate, is compared to the most likely, or highest quality, velocity profile associated with a contact of interest. If the highest quality value exceeds the threshold value, an output is provided indicating that the contact of interest represents a probable target having a velocity within the band defined by the highest quality velocity profile.

46 Claims, 8 Drawing Figures

RETROSPECTIVE DATA FILTER

STATEMENT OF GOVERNMENTAL INTEREST

The invention herein described was made in the course of or under Contract Number N00024-81-C-5301 with the Department of the Navy.

FIELD OF THE INVENTION

The present invention relates to the processing of data in a radar, sonar, ultrasound, or other such object detection communication system wherein a plurality of sectors bounded along either one, two, or three dimensions are sequentially examined for the presence of an object, or target. Accordingly, the invention extends to systems which provide a circular scan, an oscillating or reciprocating lateral scan, or a phased array scan.

TECHNOLOGICAL CONTEXT OF THE INVENTION

Various systems, particularly in the radar technology, have been developed which are intended to detect surface targets in spikey sea clutter environments where the signal-to-clutter ratio may be moderate or small. In such systems, there is often a trade-off between the probability of false alarm $P_{fa}$ (or false alarm rate) and the confidence in target detection. To assure that no targets are missed, such prior systems have often increased the $P_{fa}$, or switched to a different detection mode. Where discrimination between target and clutter is of primary significance the $P_{fa}$ is decreased with a resulting sacrifice in confidence. Adaptive thresholding and detection for different environments (see U.S. Pat. No. 4,005,415) has also been employed in prior systems.

The notion of maintaining high confidence and low $P_{fa}$ especially in various environments riddled with noise and clutter with a single processor has, in the past, been sought but realized with only limited success.

SUMMARY OF THE INVENTION

The present invention is directed to a retrospective data filter which examines each detected contact (which indicates the presence of a target, noise, clutter, or an object the detection of which is of no interest) relative to the respective positions of contacts detected over a plurality of previous, identified times. The position of each examined contact, referred to as a contact of interest, is compared in pair-wise fashion with the position of each previous contact occurring within an established time frame. At any given time, there is only one contact of interest, usually the most recently entered contact. A velocity number related to the difference in position over time for each such pair-wise comparison is derived. Each velocity number corresponds to a band of velocities in which a target may travel. The pair-wise comparisons made during the established time frame and having a particular velocity number within the time frame form a contact history which may be represented by a velocity profile. The velocity profile indicates the total number and time of previous contacts which conform to the respective velocity number. The total number of contacts and/or the relative timing of such contacts in a velocity profile is used to generate a quality value indicative of the likelihood or reasonableness that an object or target of interest is represented by the contacts noted in the profile history. As a contact of interest is compared with contacts earlier in time, the velocity profiles are updated as previous contacts which correlate with the contact of interest are filtered. As successive contacts of interest enter the retrospective data filter, the various velocity profiles are reset and updated.

In accordance with a preferred form of the invention, the identified times are defined as scans wherein each of a plurality of positional sectors (bounded in one, two, or three dimensions) are searched periodically by a radar or other such system. In addition to excluding contacts which are outside the positional sectors from the comparison process, the invention also provides a velocity limit which further limits the number of contacts which are considered relevant. Contacts which suggest the presence of an object moving too fast or too slow to be a target of interest are rejected and not considered in the velocity profiles.

Further, to process multiple scans of data, an efficient method of storing and reading back data on cue is required. The most cost effective storage media that can be written into and read back from at the high rates required for real time radar signal processing is MOS Random Access Memories (RAM). These memories can be used to store and process several thousand radar contacts per scan if an efficient method of searching the memory for data from past scans that may correlate with incoming data is devised. The present invention is able to search memory by using range or range/bearing linked correlation. The range or range/bearing ordered structure provides automatically the first dimensions range or range/bearing of a correlation process and allows a logical ordering of processes to follow a scanning device such as a radar. The memory is filled sequentially with incoming data instead of setting up specific locations for sets of data to be used in the correlation process. This is an extremely efficient utilization of the memory because every memory location is used and when the last memory location is filled, the memory is overwritten beginning with location 0. As long as the total number of memory locations is more than the number of contacts received for the correlation period, (for example, 8 radar scans), this process of memory utilization works effectively. If the number of contacts received during 8 scans exceeds the total number of memory locations, some data required in the correlation process will be overwritten.

To adapt to the condition of contacts exceeding memory location, a unique feature is embodied in the invention which adjusts the number of scans used in the correlation process to correspond to the number of valid scans of data in memory. This allows the correlation process to be carried out with 2 to 8 scans of data depending on the density of the incoming data and available memory locations. To achieve this, the amount of multiscan memory being used is monitored so that the system will be informed when the multiscan memory is completely full and hence valid data is about to be overwritten. The criteria for deciding if an overwrite of memory is about to occur is that the first available addres (FAV) of multiscan memory equals the oldest valid link address (OLD). This testing is done by storing the first link of each scan sequentially in a RAM whose address is based on the current scan number.

Thus, in accordance with the invention, the number of previous identified times or scans having contacts which are compared to a contact of interest may be varied depending on the number of contacts detected at a given time. Specifically, the multiscan memory which, for example, is used to normally compare a contact of interest with previous contacts in (n-1) previous scans adapts to compare the contact of interest with previous contacts in (n-2) or (n-3) or so on previous scans if the number of contacts detected greatly increases. Conversely, the multiscan memory automatically returns to comparing over (n-1) scans as the number of contacts detected decreases.

According to the invention, it is thus an object to maintain high confidence and low probability of false alarm in an environment of sea clutter and noise.

It is further an object of the invention to provide a hardware embodiment for directly evaluating contacts detected by a radar or such other system.

It is also an object of the invention to provide a computer model similar to the hardware embodiment, which software model may be used in evaluating contact data like the hardware embodiment and in determining the effects of modifying the hardware embodiment by making a corresponding alteration in the computer model.

BRIEF DESCRIPTION OF THE DRAWINGS

FIG. 5 is a pair of related tables which illustrate the operation of the index register and multiscan memory of the invention shown in FIG. 4.

DESCRIPTION OF THE INVENTION

General Description

Figure 1:
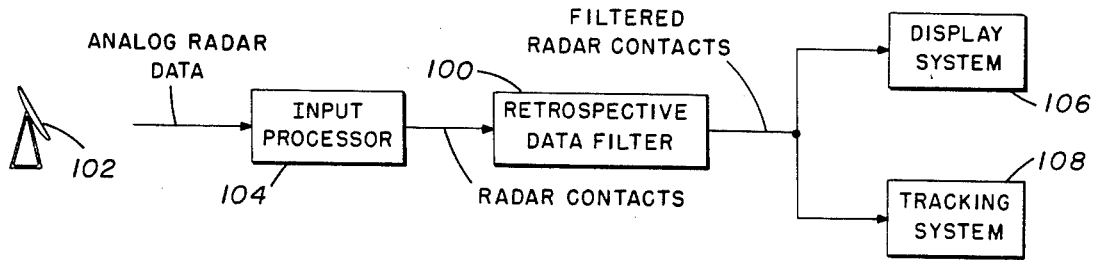
FIG. 1 shows a retrospective data filter of the invention in a radar context.

Referring to FIG. 1, one environment of the present invention is shown. In particular, a retrospective data filter 100 is illustrated in a radar system environment. A host radar 102 provides analog radar data to an input processor 104 which decides when a "contact" has been made. Exiting the input processor 104 is a set of position data corresponding to the radar contacts determined by the input processor 104. These radar contacts may correspond to target detections or may correspond to noise, clutter, or objects not of interest. The retrospective data filter 100 evaluates the set of position data of one particular contact of interest with the set of position data relating to contacts occurring prior to the contact of interest in order to determine which contacts, when viewed together, might represent, within a given probability, the presence of a target. The output of the filter 100 may enter display systems 106 and/or tracking systems 108 in order to follow probable targets.

Figure 2:
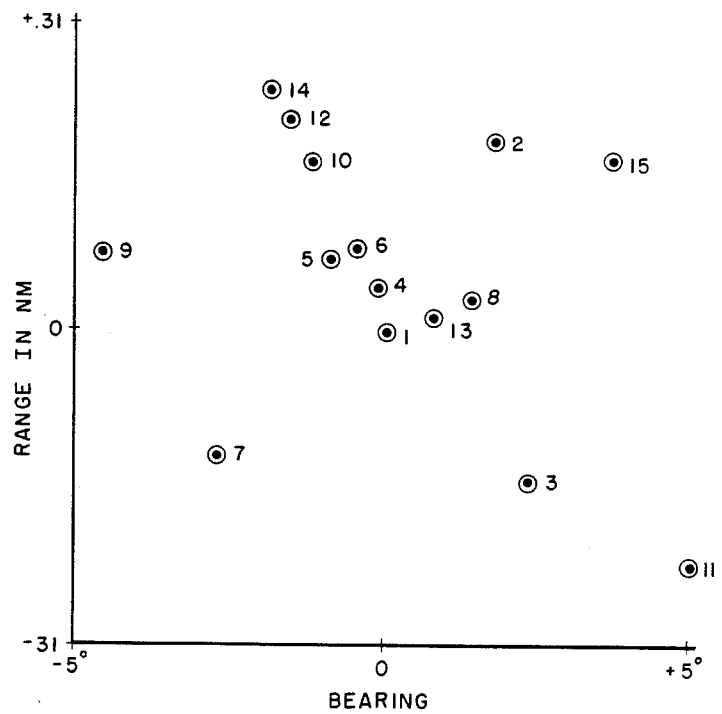
FIG. 2 is a plot showing range vs. bearing of contacts in a given location over a given time.
Figure 3:
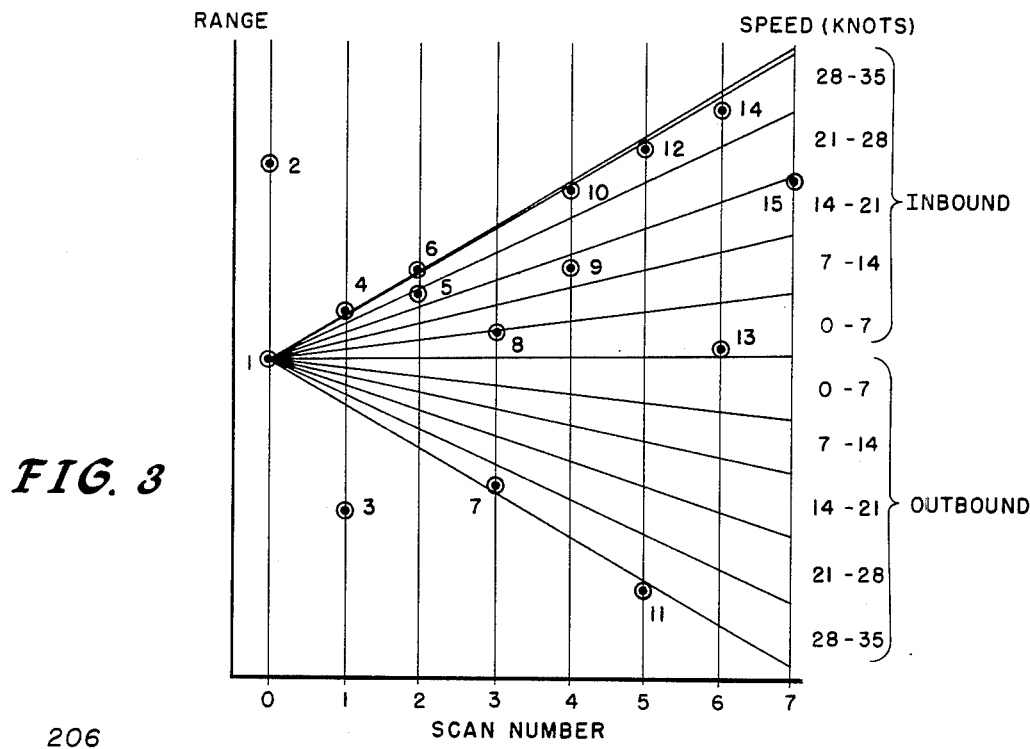
FIG. 3 is a plot showing contacts in a range vs. time (or scan number) format.

The manner in which the retrospective data filter 100 performs the filtering function is suggested by FIGS. 2 and 3. In FIG. 2, a contact of interest, contact No. 1, is shown in a sector, or range/bearing window, which also contains a plurality of other contacts. It should also be noted that the contacts shown in FIG. 2 correspond to only those contacts occurring during a predetermined number of radar scans. Thus, the contacts shown in FIG. 2 represent contacts detected within a given time frame and within a given positional sector. (The number of the contacts, it should be noted, occur in reverse chronological order).

Referring now to FIG. 3, it can be seen that the various contacts are plotted as a function of range from the contact of interest, contact No. 1, as well as a function of scan number. In particular, contacts No. 1 and 2 are shown being detected during scan 0; contacts 3 and 4 being detected during scan No. 1; contacts 5 and 6 being detected during scan No. 2; and so on. Defining the location of the contacts as a function of position and time, the illustration in FIG. 3 also sets forth a plurality of velocity bands, referenced from the contact of interest contact No. 1, which bands contain contacts previously detected. In accordance with the invention, each velocity band is examined separately to determine in which and in how many of a preset number of previous scans a contact is present.

In FIG. 3, the velocity bands are broken down into seven knot increments in the inbound and outbound directions relative to the contact of interest. An examination of Figure No. 3 indicates that within the 14 to 21 inbound velocity band, contacts 9 and 15 (at the fourth and seventh scan respectively), are present. There would thus appear to be a possibility that the contacts 1, 9, and 15 might represent a target moving inbound at a speed of 14 to 21 knots. However, an examination of the 28-35 inbound velocity band would indicate that the contacts 1, 4, 6, 10, 12, and 14 all lie within this band. In accordance with the invention, a great likelihood that a real target moving inbound at between 28 to 35 knots relative to the contact of interest, contact No. 1, would be indicated. As discussed below, in addition to simply counting the number of contacts within a given velocity band, the present invention also gives weight to where the contacts are relative to each other. For example, the location of three contacts in a row as in scan numbers 4, 5 and 6 (contacts 10, 12, and 14, respectively) may be weighted as having the higher probability of target presence than 3 contacts spaced out over the seven scans. Similarly, a contact detected closer to the contact of interest is weighted more than a contact earlier in time and further away. In the more general sense, however, the present invention simply (1) determines a velocity profile based on contacts in a given velocity band over a set number of previous scans and (2) determines the likelihood or reasonableness that the contact of interest should be defined within a particular velocity profile.

In accordance with FIGS. 2 and 3 it can be seen that there are three elementary steps performed by the retrospective data filter 100. First, a retrospective time and space correlation is performed wherein each contact detected within a given positional sector is associated with the scan during which such contact occurred. The maximum speed of a real target and the number of scans, or time, during which the correlation is made provide the limits which determine the size of the positional sector. Second, a determination is made as to which contacts, relative to the contact of interest, lie along a particular range versus time (or scan number) line or band. This determination yields a velocity profile. Third, an output decision is made based on the number and/or position of contacts in each velocity profile, indicating the reasonableness or probability of a target corresponding to a given velocity profile being present.

Figure 6:
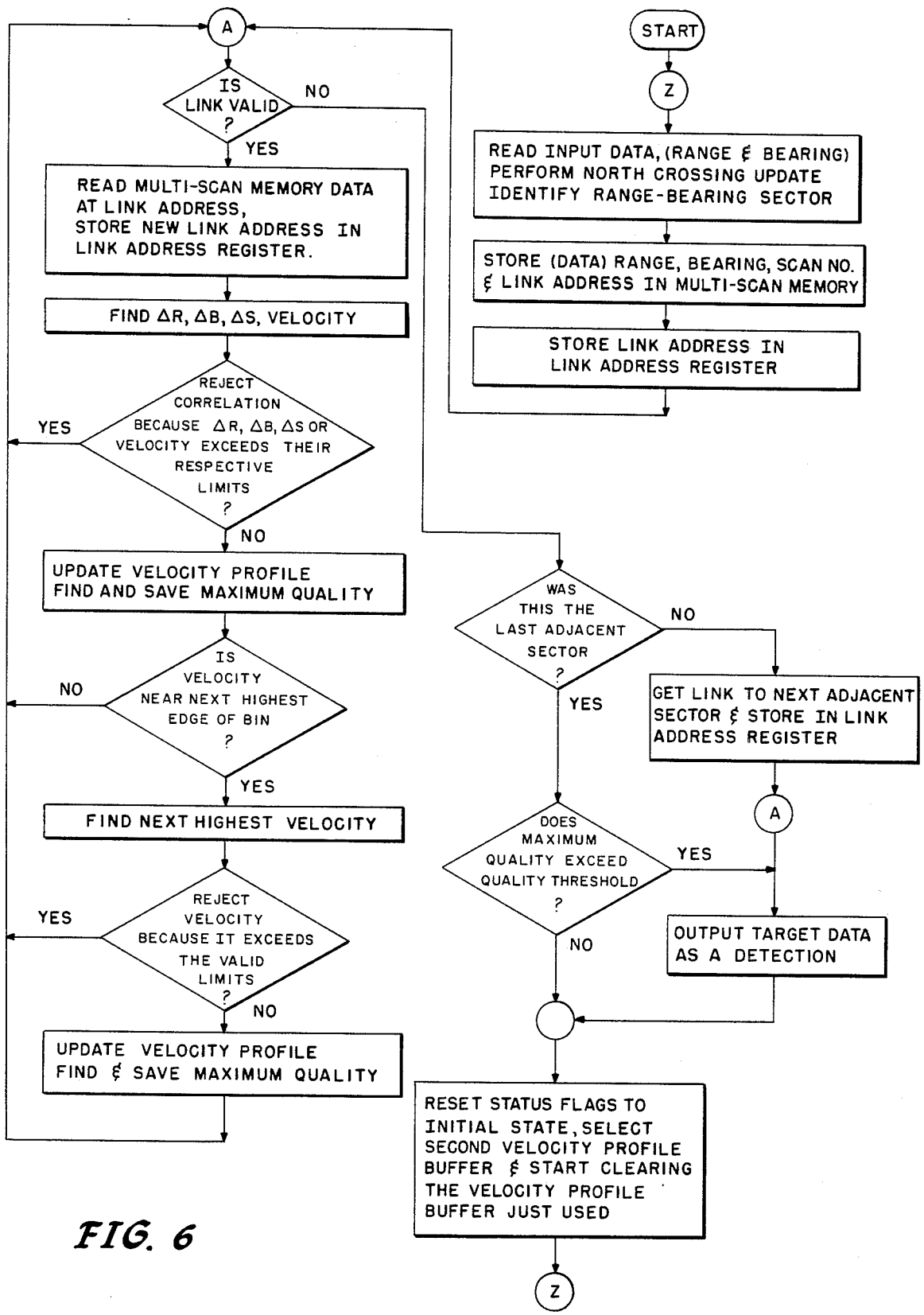
FIG. 6 is a flowchart of a computer model embodiment of the invention.

The apparatus and method for achieving the functions set forth in FIGS. 2 and 3 may be of either hardware design (see FIGS. 4 and 5) or computer model design (see FIGS. 5 and 6). Further, the contacts may correspond to isolated detections or may correspond to centroided contacts, in either case the presence of probable targets being evaluated.

Hardware Embodiment

Figure 4:
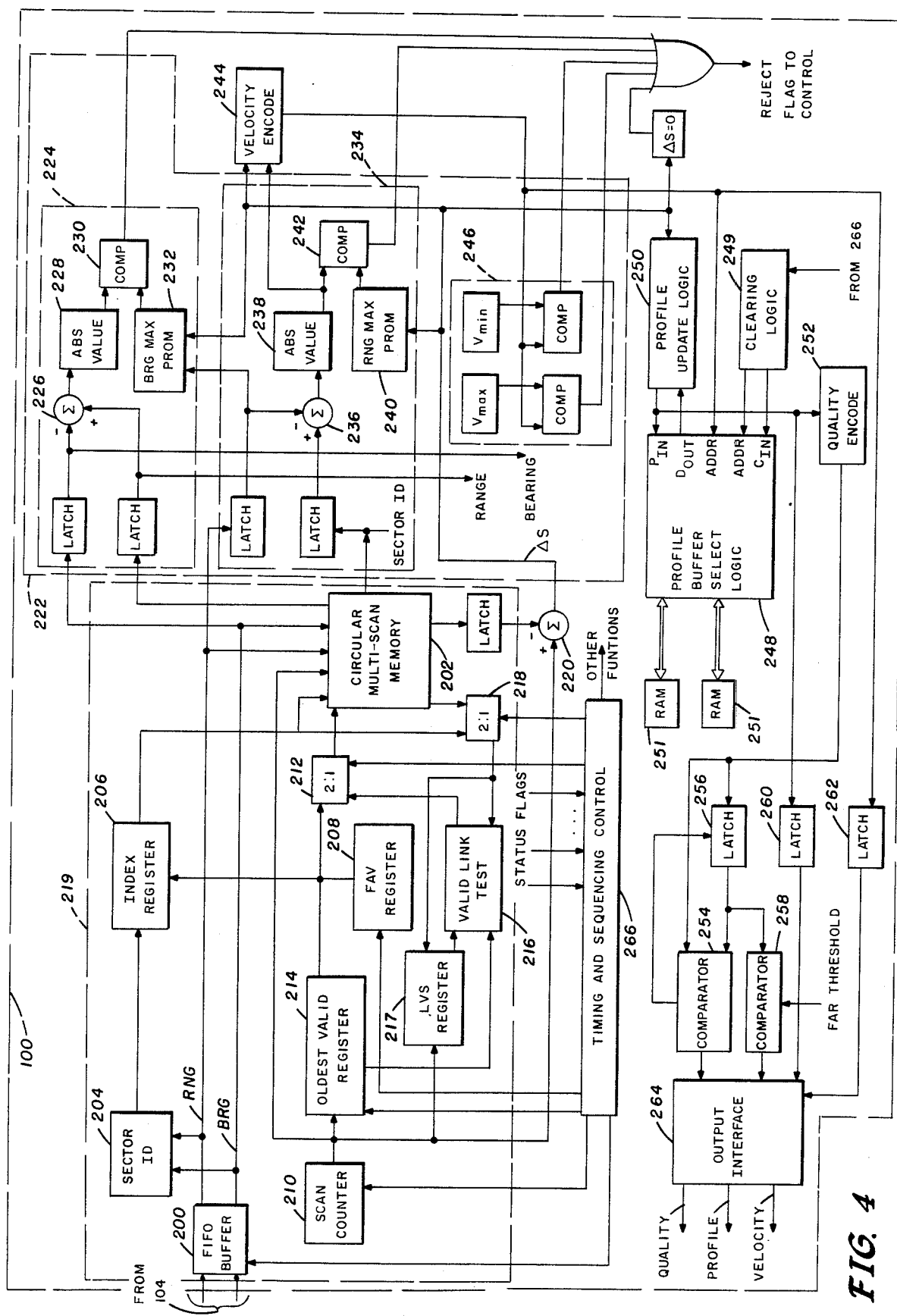
FIG. 4 is a block diagram of the invention.

Referring now to FIG. 4, a preferred hardware embodiment of the present invention in a radar context is shown. Entering the retrospective data filter 100 from the input processor 104 are range and bearing data carried along a plurality of parallel input lines. The parallel input lines enter a first-in first-out (FIFO) buffer 200 which accumulates a plurality of sets of position data (in the form of, for example, range-bearing pairs) which are put out at a rate compatible with the processing of the filter 100. If the range-bearing pairs from the input processor 104 enter the filter 100 at a rate higher than the filter 100 can process them, the FIFO buffer 200 collects and stores the pairs and provides them as input to the filter 100 at a slower rate.

Range and bearing data corresponding to each contact enters a circular multiscan memory 202. At least a most significant portion of the range and of the bearing inputs are directed to a sector ID element 204 which combines the range and bearing portions into a sector identifier which is directed to an index register 206. (The first portion of the sector identifier may comprise the most significant bits of the range input while the remainder of the sector identifier corresponds the most significant bits of the bearing input.) The sector identifier defines a positional sector. Only previous contacts in the identified sector are examined. A first available (FAV) address from a FAV register 208 is assigned for each successive contact of interest. The FAV register 208 provides incremented FAV addresses to the index register 206 for successive contacts of interest. A current FAV address and a sector identifier enter the index register 206. The multiscan memory 202 and the index register 206 perform a function referred to as "linking".

In linking, the index register 206 stores the most recent previous FAV address having the same sector identifier and the number of the scan in which it occurred. In response to the entry of the sector identifier, the index register 206 puts out the most recent previous FAV address associated with the sector identifier, thereby linking the current FAV address with the most recent previous FAV address associated with the same sector identifier. The index register 206 also puts out the scan number associated with the most recent previous FAV address. The link output and scan number from the index register 206 enters the circular multiscan memory 202 simultaneously with the range and bearing data from the FIFO buffer 200. A scan counter 210 increments each time a radar crosses a particular reference point, such as the north crossing point, the scan counter 210 counting to a predetermined number and then resetting and commencing a new count. The scan number exitting the scan counter 210 enters the circular multiscan memory 202 together with the link output from the index register 206 and the range and bearing data from the FIFO buffer to provide a single word entry. That entry is associated with the current FAV address emanating from the FAV register 208 which address is assigned to the current contact of interest. Specifically, the current FAV address enters a two-to-one switch 212 which directs the current FAV address to the circular multiscan memory 202 as the current address associated with the link-scan-range-bearing word entered. It can thus be seen that the current FAV address is associated with the link address, i.e. the most recent previous FAV address associated with the current sector identifier; the scan number of the link address; and the range and bearing of the current contact of interest. Also shown in FIG. 4 is an oldest valid register 214 which stores the oldest valid address during the processing of the current contact of interest data input. A valid link test element 216 compares the scan number in the circular multiscan memory 202 with (1) the last valid scan number (LVSN) register, 217, derived from the scan counter 210, and (2) the oldest valid scan number which emanates from the Control section 266. When a sector search begins, the Last Valid Scan number (LVSN) register 217 is set equal to the current scan number emanating from the scan counter 210. When a link address is declared valid by the valid link test element 216, the scan number associated with that link address replaces the current contents of the LVSN register 217. This method of reducing the possible locations of valid link addresses prevents linking into data that is too old to be of interest. If the link address is larger than the current first available address or is less than the oldest valid address, the link address is incorrect; the link address points to a cycle of processing prior to the current cycle which relates to the current contact of interest. Assuming the oldest valid scan number is less than or equal to the link scan number and the link scan number is less than the last valid scan number, and assuming the link address is not equal to zero, the link address is valid and is provided as output from the valid link test element 216. The link address then enters the circular multiscan memory 202 via the two-to-one switch 212.

The circular multiscan memory 202 is designed to provide as output the link address, scan, range, and bearing information associated with each address read into the circular multiscan memory 202. When the address related to the current contact of interest enters the circular multiscan memory 202, the link address scan, range, and bearing associated with that address are provided as outputs. The link address (via the valid link test element 216) enters the address input to the circular multiscan memory (202); the link address scan number, range, and bearing associated with that address input being provided as outputs. A first link address may point to yet a second link address which may circulate back into the address input of the circular multiscan memory 202, thereby providing pointing to successive link addresses within the circular multiscan memory 202. As seen in FIG. 4, each link address exiting the multiscan memory enters a two-to-one switch 218. It should thus be noted that each link address which points to yet another valid link address is processed through the multiscan memory 202 with corresponding scan, range, and bearing outputs being provided by the circular multiscan memory 202.

The data processing within the circular multiscan memory 202 is illustrated with reference to FIG. 5. Referring to the left table of FIG. 5, the various sector identifiers are listed along the left margin starting at 0 and extending beyond 18 in binary. Associated with each sector identifier is (1) the most recent previous first available address FAV in the sector (shown in the left column), (2) the scan in which it occurred, and (3) the first available address from the FAV register 208 corresponding to that sector identifier. By way of example, reference is made to sector identifier 010010 (18 in binary). In this embodiment the first three bits could represent the most significant bits of the range input and the last three bits representing bearing. The most recent previous first available address associated with the sector identifier 18 is 500 as shown in the left column. The first available address from the FAV register 208 is 620. This FAV address 620 is assigned to the current contact of interest. It will be noted that each time a new first available address enters the right column, it forces the previous contents of the right column for the particular sector identifier into the left column. In that way, the index register 206 is able to link the first available address (620 in the example) with a most recent previous first available address (500 in this example) both of which are associated with the same sector identifier (18 in this example). A subsequent contact detected in the identified sector 18 will cause a new FAV address to enter the right column, the 620 address shifting into the left column as a link address.

As shown in FIG. 4, the link address (500 in this example) enters the circular multiscan memory 202, the operation of which is depicted in the right table of FIG. 5. Referring to FIGS. 4 and 5, the FIFO Buffer 200, Index Register 206, and scan counter 210 are shown entering the link address-scan-range-bearing information associated with address 620 into the multiscan memory 202. The scan, range, and bearing information associated with the address 620 will be provided as an output from the circular multiscan memory 202. Link address 500 will then be fed back via the two-to-one switch 218, the valid link test element 216 and the two-to-one switch 212 to the address input of the circular multiscan memory 202 to read out the link address, scan, range, and bearing information relating to the address 500. Similarly, the link address of 500 is shown pointing a next link address to 420. The address 420, in like fashion, enters the circular multiscan memory 202 address input and its associated information is then read out. The linking address for address 420 is 419 which in turn links to address 300. The circular multiscan memory 202 will, accordingly, produce scan, range, and bearing outputs associated with each successive link address until it reaches a zero link or until a link address fails the valid link test 216. It will be noted that elements 200 through 218 comprise a preferred embodiment of a unit 219. The unit 219 represents means for (a) entering and sequentially storing, in an ordered fashion, data relating to contacts; (b) linking the position data of one particular contact (a contact of interest) to previously stored position data for each previous contact in a given position sector over a period of time; and (c) outputting the stored linked position data in order if valid.

Referring again to FIG. 4, it will be noted that the scan counter 210 also provides the scan number output to a subtractor 220 which compares each scan output from the circular multiscan memory 202 with the current scan number of the current contact. The output of the subtractor 220 indicates if two contacts within the same scan are being compared. If such is the case, S equals 0 and a reject flag occurs. The present invention thus compares a current contact of interest with only contacts of previous scans, i.e. the invention is retrospective. The successive range and bearing outputs from the circular multiscan memory 202 are combined with the range and bearing of the current contact of interest in a comparator 222. In the embodiment shown in FIG. 4, the comparator 222 comprises a plurality of comparing elements which provide information as to whether or not a contact of interest should be rejected as a probable target. A first comparing element 224 subtracts the bearing of the contact of interest received from the FIFO buffer 200 with the bearing output from the circular multiscan memory 202 in a subtractor 226. The output of the FIFO buffer 200 is latched to effect synchronized comparing. The absolute value of the difference is output from an element 228 and compared to a maximum bearing differential (BRG MAX) value in a bearing comparator 230. The BRG MAX value is entered into the bearing comparator 230 from a programmable read only memory (PROM) which is addressed by the range and scan number. Accordingly, the BRG MAX value between the contact of interest and the output from the circular multiscan memory 202 may be varied as a function of scan number and range. If the bearing comparator 230 indicates that the change in bearing between the contact of interest and the contact corresponding to the output of the circular multiscan memory 202 exceeds the programmed maximum, a signal is provided that the contact of interest should be rejected as a probable target with respect to the compared contact. That is, viewing the contact of interest and the compared contact, the comparator 224 determines that the change in bearing is greater than that reasonably expected for a target which is to be detected. Similarly, a comparing element 234 is provided for range. Again, the range of the contact of interest and the range corresponding to the contact whose data is being outputted by the circular multiscan memory 202 are latched, after which they are subtracted in a subtractor 236 the difference of which enters an absolute value element 238 which provides the difference from the subtractor 236 as a magnitude only. The magnitude of the range differential is then compared to a range differential maximum (RNG MAX) which is stored in a PROM 240, the two values being compared in a range comparator 242. If the magnitude of the range differential is greater than the programmed RNG MAX, a signal indicating that the contact of interest is outside the reasonable limits of the range is provided. That is, the difference in range between the previous contact and the contact of interest is too great to suggest a probable target defined by the two contacts. The magnitude of the range differential (from element 238) also enters a velocity encode element 244 which divides the magnitude of change of range by the number of scans between the contact of interest and the previous contact which is being compared to the contact of interest. The velocity encoder 244 thus provides a velocity number which is indicative of the range rate of a probable target. A third comparing element 246 compares the velocity number with a maximum and a minimum velocity number in order to determine if the range rate output of the velocity encoder is within predefined range rate limits. This comparing element permits the retrospective data filter 100 to accept only those targets within a predetermined speed range while objects moving at rates outside the predetermined range are ignored or rejected. For example, referring to FIG. 3, the comparing element 246 could be set such that only targets moving at a rate of 21 to 35 knots inbound would be accepted as targets to be detected. Such a limit might be included in a system for object avoidance, outbound targets not being of interest and targets below a certain velocity being easily maneuvered around rendering their detection not significant.

Assuming that the contact of interest and the contact being compared to the contact of interest do not occur during the same scan; the range and bearing differentials do not exceed their prescribed maximums; and the range rate is within the predetermined velocity limits, the velocity number exiting the velocity encoder 244 enters a profile buffer 248 which contains an (n-1)-bit word contact history for each velocity profile where n equals the maximum possible number of scans processed. That is, referring back to FIG. 3, there would be one contact history for the 28 to 35 knot inbound profile, each bit in the contact history corresponding to a contact or no contact at one of the successive scans.

Initially, all of the (n-1) bit word contact histories are reset to a zero state. This is performed by clearing logic 249 after contacts in all scans have been examined. In the case of the embodiments suggested by FIG. 3, each contact history would thus correspond to a 7-bit word comprised of seven zeros.

To form a contact history for a given velocity profile, such as for the 28 to 35 knot velocity band shown in FIG. 3, the following steps occur. First, a velocity number corresponding to the first linked, or first preceding, contact relative to the contact of interest enters the profile buffer 248 as an input. The velocity number is initially assigned to a velocity band in which it fits. Each band corresponds to a particular velocity profile defined by one of the 7-bit words. The velocity number thus first addresses the one particular 7-bit word in the profile buffer 248. Simultaneous with the entry of the velocity number into the profile buffer 248, a scan differential input is provided to a profile update logic element 250. The scan differential input (ΔS) indicates the number of scans between the contact of interest and the contact being compared with the contact of interest. The velocity number instructs the profile buffer 248 which 7-bit word to enter into the profile update logic 250. The 7-bit words are addressed in correspondence with the velocity numbers. The 7-bit word (initially all zeroes) enters the profile update logic 250 via the port $D_{out}$. The value of ΔS which enters the profile update logic 250 indicates which bit in the 7-bit word should be set to "1". Assuming the contact of interest is in scan zero, the first bit of the 7-bit word would correspond to the first scan and the seventh bit would correspond to the seventh scan. A "1" in the second bit would thus represent the presence of a contact in the second scan, which contact is characterized in having a velocity number which fits within a given velocity band.

In operation, then, a velocity number from a velocity encoder 244 and a ΔS=5 value from the subtractor 220 may, for example, enter the profile buffer 248 and profile update logic 250, respectively. The velocity number addresses a 7-bit velocity profile word which may, in this example, be 0100000. The 7-bit word represents contacts in previous scans (i.e. scans one through four) which had contacts identified with velocity numbers corresponding to the velocity band associated with the 7-bit word. So far, in this example, only a contact in the second scan had a velocity within (or at least nearly within) the associated velocity band. The 7-bit word 0100000 enters the profile update logic 250 where the value ΔS indicates which bit is to be set. ΔS=5 causes the fifth bit to be set and the updated word 0100100 reenters the profile buffer 248. If a contact in the sixth scan is detected having a velocity number in (or nearly in) this same band, the 7-bit word will again be updated to 0100110 and so forth. Accordingly, each (n-1) bit word is updated with each subsequent scan until the contact of interest has been compared with all relevant contacts in the previous (n-1) scans. The profile buffer 248 is shown comprising two alternating RAM memories 251. The RAM memories are provided such that they may be used in alternation. Accordingly, if velocity numbers are entering at a high input rate, the data may be processed by one portion of the buffer while the other portion is performing a time-consuming erasure, thereby reducing overall processing time.

Each updated profile which exits the profile update logic element 250 also enters a quality encode element 252. In accordance with this preferred embodiment, the quality encode element 252 uses information relating to both the total number of its set bits in each updated 7-bit word as well as the location of those set bits, in order to determine the reasonableness or the likelihood of a target being represented thereby. Specifically, for each possible velocity profile word, which may range from 0000000 to 1111111, a quality value is assigned. For example, in accordance with the quality encode element 252, a higher quality may be assigned to a velocity profile word having 1111 followed by 000 than for a word in which the first, third, fifth, and seventh bits were set to a "1" value. The output from the quality encoder element 252 enters a comparator 254 which compares the encoded quality with a previously stored highest quality value for previous profiles relating to the same contact of interest. The larger quality value exiting the comparator 254 enters a latch 256 the output from which is compared with the output from the quality encoder in the comparator 254. In addition, the highest quality value stored in the latch 256 is also directed to a further comparator 258 which compares the highest quality in the latch to a preset threshold quality. The comparator 258 assures that the highest quality put out by the latch 256 exceeds a particular false alarm rate (FAR) threshold. The higher the threshold, the higher the quality of the word required to provide a "reasonable" target output. The word corresponding to the highest quality generated relative to a particular contact of interest; and the velocity number of such contact of interest are stored in latches 260 and 262, thereafter entering an output interface 264 which provides the quality, profile, and velocity number as outputs. The range and bearing of the contact of interest are also provided as outputs for further processing. It will also be noted that a timing and sequence control 266 is connected to various elements in the retrospective data filter 100 to synchronize various timing and control actions.

Adaptable Memory

In order to account for variations in the data input rate of the filter 100, the oldest valid register 214 (and multiscan memory 202) are designed to be adaptable. In this way, the number of scans used in the correlation process can be made to vary. Specifically, a current contact of interest can be correlated with contacts occurring in from one to, in the present embodiment, seven previous scans. The circuit structure which permits correlation of a contact of interest with contacts in one to seven previous scans is shown in FIG. 7.

Figure 7:
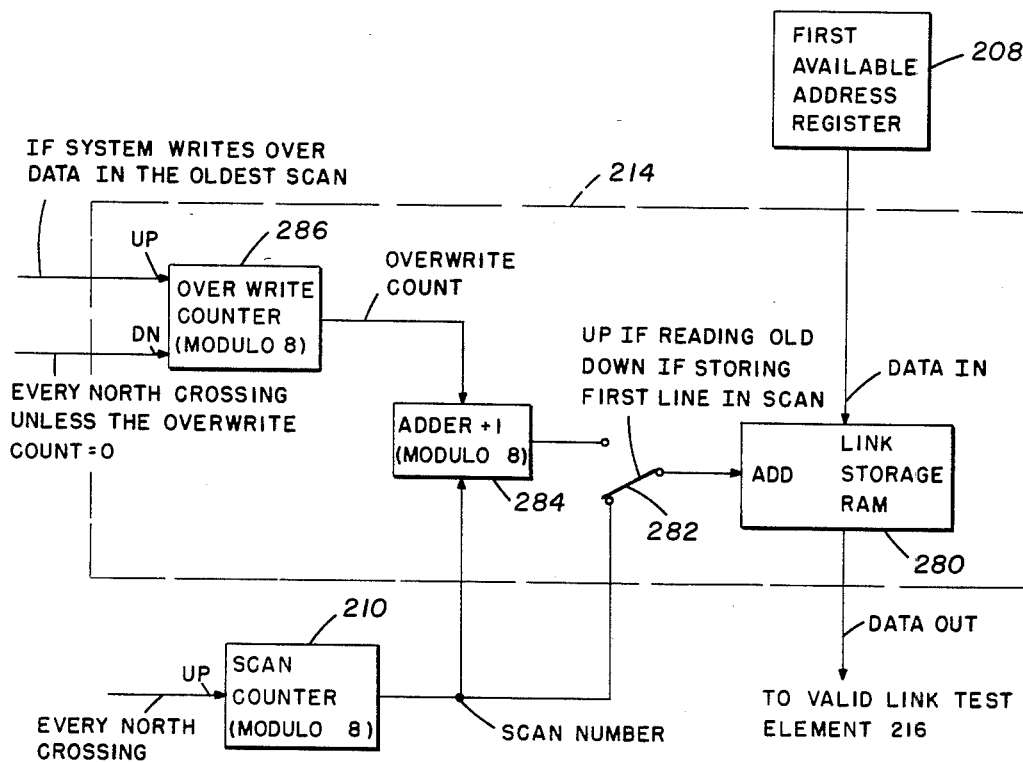
FIG. 7 is a block diagram featuring the adaptable memory feature of the invention.

In FIG. 7, the components of the oldest valid register 214 are shown relative to the elements set forth in FIG. 4. The first available address register 208 provides the first available address to a link storage RAM 280. The output of the link storage RAM 280 enters the valid link test element 216. The link storage RAM 280 has an add input which is connected to a 2-to-1 multiplexer 282 which selectively connects a modulo-8 adder 284 or the scan counter 210 to the add input. The modulo-8 adder 284 has a scan number input from the scan counter 210 and an input from a modulo-8 overwrite counter 286. The overwrite counter 286 has two inputs, an UP input and a DOWN input.

To describe the operation of the circuit structure of FIG. 7, it is initially assumed that the scan number is 0 and both the index register 206 (of FIG. 4) and the link storage RAM 280 are filled with zeroes. The first contact in scan zero is stored at location one of the multiscan memory 202 (of FIG. 4). Subsequent contacts are serially entered into sequential locations in the multiscan memory 202 as suggested in FIGS. 8(a) and 8(b). After all contacts from scan zero are stored, the scan counter is incremental and the first contact in scan one is stored at the next location 1700 (see FIG. 8a). This is indicated in the link storage RAM 280 by storing "1700" at location "1". This process continues until seven scans of data have been stored. Processing starts when seven scans of data have been saved. At this time, a contact-of-interest is read in from scan 7. The contact of interest is stored in the multiscan memory 202 at the FAV location 15000, and this address is in turn stored in link storage at location 7 (i.e., scan 7). To find the oldest valid scan number and hence the oldest valid address in the multiscan memory 202 associated with the present scan, the scan number is incremented in the modulo-8 adder 284 and entered into the address link storage RAM 280 via the 2-to-1 multiplexer 282. During scan 7, $_{20}$ the addition yields:

$$7+1=8=0 \pmod 8$$

Figure 8:
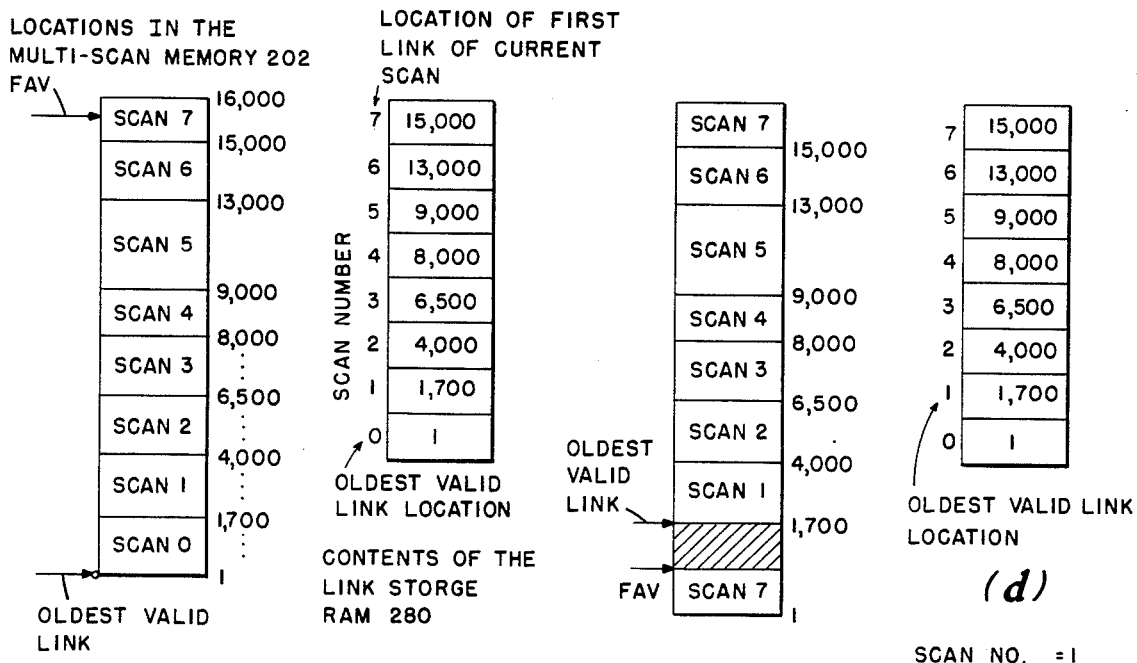
FIG. 8 is a plurality of tables illustrating the operation of the adaptable memory of FIG. 7.

When location "0" of link storage is read, the oldest valid address of element 216 associated with scan 7 is found, which in this case is "1". If the data in scan 7 fills multiscan memory 202 and overwrites data of scan zero, the system will recognize this condition by testing to see if FAV=OLD as discussed with reference to FIG. 4 above. When this occurs, the modulo-8 overwrite counter 286 is incremented from zero to one and the resulting count is added to the oldest valid scan number. The effect of incrementing the overwrite counter 286 is shown in FIG. 8(c) and 8(d). The oldest valid scan number plus the overwrite count equals one (modulo-8). The OLD address is now 1700 and the system will process only:

$$8 - \text{overwrite count} = 7 \text{ scans.}$$

If another scan is corrupted, the overwrite counter 286 is again incremented to point to the oldest valid address in six scans.

As the incoming data rate decreases and more of the multiscan memory 202 becomes available, the filter 100 returns to an eight-scan configuration by decrementing the overwrite counter 286 at the beginning of each scan until the overwrite count equals zero.

Logic Flowchart of the Retrospective Data Filter

Referring to FIG. 6, a flowchart describing the operation of the retrospective data filter is shown. The flowchart may be used in following the hardware previously discussed with reference to FIG. 4 or may be employed in defining a software embodiment such as that described below. In accordance with the flowchart, it can be seen that range and bearing input is entered and the sector is identified. Link, scan, range and bearing data is then entered into the multiscan memory (202 of FIG. 4). The link address is also stored in the link address register, which is part of the valid link test 216. A check is made to determine the validity of the link. If the link is valid, the differential range, differential bearing, differential scan, and velocity are compared to predetermined limits to determine if the contact of interest should be rejected as a possible target. If the contact of interest is not rejected, the word in memory corresponding to a particular velocity profile is updated. The word for each velocity profile is defined with a corresponding quality, the word having the highest quality (over a given threshold) being provided as an output.

In accordance with the flowchart, an additional feature is provided. A determination is made if the velocity number corresponding to the maximum quality velocity profile is positioned near the higher or faster edge of a velocity band. If not, the next contact in the link chain is compared to the contact of interest until an invalid link is detected. If, however, the velocity corresponding to the velocity number is near the faster edge of a velocity band, the contact will also be examined as if it occurred within the adjacent velocity band. It will determine if the contact data falls within prescribed velocity limits and, if so, a repetitive update of the words corresponding to the velocity profiles will be performed as if the contact were present in the adjacent velocity band. Appropriate encoded quality outputs associated therewith are thus also derived. This feature accounts for the possibility of a contact straddling two velocity bands.

In accordance with the flowchart of FIG. 6, if a link is found to be invalid (as by a valid link test element 216 of FIG. 4) the repetitive velocity profile updating ceases and further processing may be performed. This further processing may include, if desired, the examination of more than one sector for each contact. In particular, if a contact is in the lower left portion of a sector, the filter is definable to provide examination of not only the sector in which the contact is found but also (1) the sector below that sector; (2) the sector to the left of that sector; and (3) the diagonally positioned sector which is below and to the left of that sector. Accordingly, for each such contact, four such sections may be examined.

In accordance with the flowchart of FIG. 6, a step is provided which determines if the last adjacent sector has been examined. If not, the link to the next adjacent sector is provided and the repetitive process of determining the validity of links, checking the various preset limits, and updating the profiles and determining their quality is provided relative to the contacts of such adjacent sector. If the last adjacent sector has been examined, the maximum quality of any word corresponding to a velocity profile found in any of the four examined sectors is compared with a preset threshold. If the maximum quality of the velocity profile exceeds the threshold, which is indicative of the false alarm rate, (FAR), a signal is provided indicating that a probable or reasonable target is present. If the maximum quality does not exceed the threshold, the retrospective data filter 100 is initialized for the receipt of a new contact of interest. As previously discussed relative to FIG. 4, where two alternating profile buffers are included in the profile buffer 248, one would be cleared at the end of the following the comparison of the highest quality of threshold while the other is used to update the incoming data relative to the incoming contact of interest. After initialization and the switching from one alternation buffer portion to the other, the filter 100 begins to examine the new contact of interest as the previous contact of interest was examined.

Computer Model Embodiment of the Retrospective Data Filter

In substantial conformance with the flow chart described relative to FIG. 6, a computer model of the retrospective data filter, shown as hardware in FIG. 4, is illustrated by the Listing of computer instructions, in the Fortran language, as shown in Table 1. While performing similar functions to the hardware embodiment, the computer model has additional uses as well. Because the computer model substantially tracks the hardware embodiment, the computer model may be modified in various ways to determine the effect such changes would have in the hardware design.

With reference to the computer model set forth in Table 1, it will be noted that a general non-mathematical algorithm is provided. A set of range and bearing data for a new contact of interest is read in and stored in the multiscan memory. The multiscan memory is organized to contain the link address, the scan number, the range and the bearing (as in the hardware embodiment). The link address is determined by finding the sector in which the contact of interest lies. Once the sector has been found, the appropriate link address is obtained from a sector look-up table (which provides a function similar to that of the index register 206). The link address is then stored in the multiscan memory. The sector look-up table is then updated with the current address with the multiscan memory. At the beginning of each scan, the address of the oldest contact link list is stored in a look-up table. The look-up table is designated as the oldest address table (which is comparable to the oldest valid register 214 of FIG. 4). Its purpose is to store the last valid address to be used during the correlation process for a particular contact of interest. Through the use of link addresses stored in association with each contact, it is possible to correlate the contacts of a plurality of successive scans in order to determine whether they together may represent a probable target. If so, the contacts are filtered through the retrospective data filter. Each such contact will provide input to a continously updated velocity profile. After all of the previous contacts of this sector (which in the model is a range sector) have been filtered, the valid contacts of the next adjacent range sector are filtered through. (It should be noted that the hardware embodiment provides a range/bearing sector whereas the computer model provides a range sector. With each contact in the hardware embodiment, there are thus three adjacent sectors which may be evaluated. With the range sector format, there is but one adjacent sector. It should, in this regard, be evident that sectors defined in range, or in bearing, or in range and bearing may be provided in accordance with the invention). At the completion of the correlation process, the filter bins (corresponding to respective velocity profiles) are evaluated. Each filter bin is assigned a quality number based upon the hit pattern of each bin. If the highest quality number found for a contact exceeds a threshold value, then the contact is reported. This process is repeated as each new contact of interest as read in.

In accordance with the invention, there are two methods by which a contact may be filtered. The first method evaluates the contact based upon the velocity tracks correlated from the previous seven scans. Each valid linked contact is evaluated to determine its speed and whether it is inbound or outbound. The other method evaluates the contact based upon a speed and heading angle track profile. The heading angle may be calculated from one of two methods. The first method calculates a heading angle based upon the changes of position in rectangular coordinates. The second method of calculating heading is based upon the changes of position in polar coordinates. These various methods and submethods are within the contemplation of the invention.

The various routines which together form the retrospective data filter computer model are, in compiled form, named RDP2. Its main purpose is to define the COMMON blocks used through the program. In order to initialize certain program parameters, the subroutine INPUT is called. Other program parameters are initialized in the BLOCK DATA subroutine. This is a special subroutine used to initialize variables listed in the COMMON blocks.

After the initialization process is completed, the program is ready to begin filtering the data. The subroutine GETDAT is used to find the data which, in accordance with this computer model embodiment, is centroided previously. GETDAT uses two buffers and no-wait reads to provide the centroid data with a minimum amount of delay.

The centroid data is reported to the subroutine READER which calls GETDAT. READER decodes the centroid data and stores it in the multiscan memory (MSM). It also determines the range sector of the contact and the adjacent range sector to be searched. READER will also adjust the correlator should the MSM overflow. READER is the controlling subroutine of the program since it initiates the correlation process and evaluates the highest quality number found. If an acceptable contact is found, then this contact is written in the file RDP.DAT which can later be dumped to a printer or used to plot the tracks with the task RDPPLOT. When the program is ready to terminate, the number of contacts reported as listed by quality number will be written on the file RDPSUM.DAT.

The linking process is done in the subroutine LINKER. LINKER goes through the linked list to determine which of the previous contacts should be put through the correlator. These tests are based on the differences in range and bearing between contacts. The acceptable differences in range and bearing will vary with the time between scans.

The present computer model, like the hardware embodiment, is used to indicate which contacts detected by a radar, sonar, ultrasound, or other such object detection communication systems designate based on contacts occurring at previous times, are probable targets. The probable targets may be displayed or plotted or may be used by tracking systems as desired.

MODIFICATIONS

It will, of course, be noted that the teachings of the present invention apply to object detection communication systems having a circular scan, a lateral reciprocating scan, or even a scan produced by a phased array. Instead of scan number, a different time dependent function may accordingly be used.

Further, as previously indicated, sectors may be identified by range or bearing or both. Alternatively, sectors may be defined in Cartesian coordinates with no significant design changes. Also, the range-bearing input data from the input processor 104 (of FIG. 1) may be centroided or not; the invention will process either form of data.

Still further given the teachings of the invention in a two-dimensional surface radar environment, it is contemplated that a three-dimensional embodiment be a further variation to range and bearing embodiments set forth above. Defining sectors in three dimensions would add to the number of adjacent sectors; other than such quantitative changes the invention would operate similarly.

As to the hardware design, an alternative to range rate (as discussed relative to the computer model) may be employed wherein a vector analyzer provides a true velocity indicator output. It is evident that this would involve a heading angle calculation to be made. Implicit in this realization is a need for heading angle profile histories in addition to the speed profile histories already present. Such an implementation can be found in the computer model.

As described, each of the previous (n−1) successive scans are included in each velocity profile. Velocity profiles including data from only selected scans are also within the scope of the invention and, in view of the teachings, are logical extensions or variations thereof.

Various modifications, adaptations and alterations to the present invention are of course possible in light of the above teachings, in addition to those set forth specifically. It should therefore be understood at this time that within the scope of the appended claims the invention may be practiced otherwise than as specifically described hereinabove.

We claim:

1. In a scanning target detection system, a retrospective data filter for determining, based on position data corresponding to each of a plurality of contacts detected in respective position sectors during a plurality of scans, the probable presence of a target, the filter comprising:

means for entering position data corresponding to a contact of interest, the contact of interest being located in a defined position sector;

a multiscan memory which (a) stores position data corresponding to each contact detected (i) at a time previous to and (ii) in the same position sector as the contact of interest and (b) outputs the position data corresponding to the previous detected contacts in the same position sector as the contact of interest;

comparator means for comparing, in pairwise fashion, the entered position data of the contact of interest with the stored position data of each contact detected (a) in the same position sector as and (b) during a scan prior to that of the detection of the contact of interest;

encoder means for deriving, based on (a) each comparison made in the comparator means and (b) the relative detection times of the contact of interest and each particular compared contact, a corresponding velocity number which is indicative of

TABLE I

```
C
C   MAIN ROUTINE FOR THE RETROSPECTIVE DATA PROCESSOR MODEL
C
C   THE MAIN PURPOSE IS TO DEFINE THE COMMON BLOCKS
C
C   THIS ROUTINE IS FOUND IN THE FILE RDPMAIN.FTN
C
    IMPLICIT INTEGER (A-Z)
    REAL SRATE,VMAX,RMAX,DRMAX,RSLEN
    REAL VWIDTH,HWIDTH,BCOI,RCOI,BOLD,ROLD,DB,DR
    REAL BRES,RRES
    REAL RCONV,BCONV,DRCONV,HDG,VEL
    REAL DHLO,DHHI
    INTEGER BMSM(2048),RMSM(2048),SMSM(2048),LMSL(2048),OLDAD(8)
    INTEGER LADDR(64),RSLINK(2),PBIN(36,100),QDCODE(128),BUFF(20)
    COMMON/BLK1/  SRATE,VMAX,RMAX,DRMAX
    COMMON/BLK2/  RMASK,BMASK,MAXSCN,RSLEN
    COMMON/BLK3/  VWIDTH,HWIDTH,HCALC
    COMMON/BLK4/  BCOI,RCOI,BOLD,ROLD,DB,DR,SCOI,DS
    COMMON/BLK5/  BMSM,RMSM,SMSM,LMSM,OLDAD
    COMMON/BLK6/  FAV,LARGEA
    COMMON/BLK7/  LADDR,RSLINK,SDUM
    COMMON/BLK8/  PBIN,QMAX,QV,QH
    COMMON/BLK9/  QDCODE
    COMMON/BLK10/ MINHIT
    COMMON/BLK11/ GOODQ
    COMMON/BLK12/ BUMP
    COMMON/BLK13/ UNIT,BUFF,NUMWDS,RECCNT,BLKCNT,GETMOD
    COMMON/BLK14/ RCONV,BCONV,DRCONV
```

```
      COMMON/BLK15/ HDG,VEL
      COMMON/BLK16/ VMIN
      COMMON/BLK17/ BRES,RRES,MODE,VINDC
      COMMON/BLK18/ HMAX,DHLO,DHHI
      DATA CLOSE/O2400/,EVEFLG/1/
      CALL SETEF(EVEFLG,IDS)
C
C  OPEN DUMP FILES
C
      CALL ASSIGN(3,'DB0:RDP.DAT')
      CALL ASSIGN(4,'DB0:RDPSUM.DAT')
C
      CALL INPUT
      GOODQ=QDCODE(129-2**(7-MINHIT))
      DRCONV=ACOS(-1.)/180.0
      CALL READER
C
C  CLOSE DUMP FILES
C
      CLOSE(UNIT=3,DISP='SAVE')
      CLOSE(UNIT=4,DISP='SAVE')
      CALL QIO(CLOSE,UNIT,1,VMIN,RSLINK,LADDR,BUMP)
      IF(RSLINK(1).NE.1) WRITE(5,*) RSLINK(1)-256
      STOP
      END

SUBROUTINE TO INTERACTIVELY INITIALIZE PARAMETERS

THIS SUBROUTINE IS FOUND IN THE FILE RDPINP.FTN

IMPLICIT INTEGER (A-Z)
      REAL SRATE,VMAX,RMAX,DRMAX,RSLEN,HWIDTH,VWIDTH
      REAL BRES,RRES
      REAL DHLO,DHHI
      REAL RCONV,BCONV,DRCONV
      INTEGER BUFF (20),IPARAM(6)
      COMMON/BLK1/SRATE,VMAX,RMAX,DRMAX
      COMMON/BLK2/ RMASK,BMASK,MAXSCN,RSLEN
      COMMON/BLK3/ VWIDTH,HWIDTH,HCALC
      COMMON/BLK10/ MINHIT
      COMMON/BLK13/UNIT,BUFF,NUMWDS,RECCNT,BLKCNT,GETMOD
      COMMON/BLK14/ RCONV,BCONV,DRCONV
      COMMON/BLK16/VMIN
      COMMON/BLK17/ BRES,RRES,MODE,VINDC
      COMMON/BLK18/ HMAX,DHLO,DHHI
      DATA SKIP/O2440/
      DATA DEV/'MT'/,IDSW/0/,MOUNT/O2560/
      WRITE(5,*) 'WHAT IS MODE OF OPERATION'
      WRITE(5,*) '  HEADING AND VELOCITY  MODE   (RESPOND--0)'
      WRITE(5,*) '   VELOCITY MODE (RESPOND--1)'
      READ(5,*) MODE
      IF((MODE.LT.0).OR.(MODE.GT.1) GO TO 5
      VINDC=51**MODE
      WRITE(5,*) 'WHAT IS THE SCAN RATE (SECONDS)'
      READ(5,*) SRATE
      IF(SRATE.LE. 0.0) GO TO 10
      WRITE(5,*) 'WHAT IS THE MAXIMUM TARGET VELOCITY (KNOTS)'
      READ(5,*) VMAX
      IF(VMAX.LE. 0.0) GO TO 20
      WRITE(5,*) 'WHAT IS THE MAXIMUM RADAR RANGE (NM)'
      READ(5,*) RMAX
      IF(RMAX.LE. 0.0) GO TO 30
      WRITE(5,*) 'WHAT IS THE VELOCITY BIN WIDTH (KNOTS)'
      READ(5,*) VWIDTH
       IF(VWIDTH.LE. 0.0) GO TO 40
      IF((IFIX(VMAX/VWIDTH+1).LE.(101-VINDC)) GO TO 45
      WRITE(5,*) 'VELOCITY BIN WIDTH IS TOO SMALL'
      GO TO 40
      IF(MODE.EQ.0) GO TO 50
```

```
           VMIN=-VMAX
           GO TO 85
           WRITE(5,*) 'WHAT IS THE MINIMUM ACCEPTABLE VELOCITY (KNOTS)'
           READ(5,*) VMIN
           IF((VMIN.LT.0).OR.(VMIN.GT.VMAX)) GO TO 50
           WRITE(5,*) 'WHAT IS THE HEADING BIN WIDTH (DEGREES)'
           READ(5,*) HWIDTH
           IF(HWIDTH.GE. 10.0) GO TO 60
           WRITE(5,*) 'THERE IS A 10 DEGREE MINIMUM WIDTH'
           GO TO 55
           HMAX=IFIX(360.0/HWIDTH+ .9999999)
           DHLO=.1*HWIDTH
           DHHHI=9.*DHLO
           WRITE(5,*) 'WHAT METHOD OF HEADING CALCULATION'
           WRITE(5,*) '   DELTA BEARING, DELTA RANGE (RESPOND--1)'
           WRITE(5,*) '   DELTA X, DELTA Y            (RESPOND--2)'
           READ(5,*) HCALC
           IF((HCALC.LT.1).OR.(HCALC.GT.2)) GO TO 80
           WRITE(5,*) 'WHAT IS THE RADAR BEARING RESOLUTION'
           READ(5,*) BRES
           IF(BRES.LT.0) GO TO 85
           WRITE(5,*) 'WHAT IS THE MAXIMUM SCAN NUMBER'
           READ(5,*) MAXSCN
   90      WRITE(5,*) "HOW LARGE ARE THE RANGE SECTORS (NM)'
           READ(5,*) RSLEN
           DRMAX=VMAX/3600.*SRATE
           IF((8.*DRMAX).LE.RSLEN) GO TO 100
           WRITE(5,*) 'RANGE SECTORS ARE TOO SMALL FOR THIS CORRELATOR'
           GO TO 90
  100      IF(IFIX(RMAX/RSLEN+0.999).LE.64) GO TO 110
           WRITE(5,*) 'RANGE SECTORS ARE TOO SMALL'
           GO TO 90
  110      WRITE(5,*) 'WHAT IS TWICE THE RADAR RANGE RESOLUTION (NM)'
           READ(5,*) RRES
           IF(RRES.LT. 0.0) GO TO 110
  115      WRITE(5,*) 'HOW MANY HITS OUT OF SEVEN FOR A GOOD COI'
           READ(5,*) MINHIT
           IF((MINHIT.LT.0).OR.(MINHIT.GT.7)) GO TO 115
  120      WRITE(5,*) 'WHAT TAPE UNIT (0 OR 1)'
           READ(5.*) UNIT
           IF((UNIT.LT.0).OR.(UNIT.GT.1)) GO TO 120
           CALL ASNLUN((UNIT+1),DEV,UNIT,IDSW)
           UNIT=UNIT+1
           CALL SETEF(IEFLAG,IDSW)
           CALL WTQ10(MOUNT,UNIT,IEFLAG,IPRIOR,IOSB,IPARAM,IDSW)
  125      IF(IDSW.EQ.0) GO TO 125
  130      WRITE(5,*)'SKIP HOW MANY FILES'
           READ(5,*) IPARAM(1)
           IF(IPARAM(1).LT.0) GO TO 130
           IF (IPARAM(1).EQ.0) GO TO 150
           CALL WTQIO(SKIP,UNIT,IEFLAG,IPRIOR,IOSB,IPARAM,IDSW)
  140      IF(IDSW.EQ.0) GO TO 140
  150      RETURN
           END
    C
    C
    C   SUBROUTINE TO 1) READ IN DATA
    C                 2) STORE DATA
    C                 3) FIND RANGE SECTORS
    C                 4) ADJUST CORRELATOR IF MEMORY OVERFLOW
    C                 5) START LINKING
    C                 6) EVALUATE HIGHEST PROFILE FOUND
    C
    C   THIS SUBROUTINE IS FOUND IN THE FILE RDPREAD.FTN
    C
           IMPLICIT INTEGER (A-Z)
           REAL SRATE,VMAX,RMAX,DRMAX,RSLEN
           REAL BCOI,RCOI,BOLD,ROLD,DB,DR,RCONV,BCONV,DRCONV
           REAL HDG,VEL
```

```
      INTEGER BMSM(2048),RMSM(2048),SMSM(2048),LMSM(2048),OLDAD(8)
      INTEGER LADDR(64),RSLIND(2),BUFF(20),PBIN(36,100),SUM(128)
      COMMON/BLK1/ SRATE,VMAX,DRMAX
      COMMON/BLK2/ RMASK,BMASK,MAXSCN,RSLEN
      COMMON/BLK4/ BCOI,RCOI,BOLD,ROLD,DB,DR,SCOI,DS
      COMMON/BLK5/ BMSM,RMSM,SMSM,LMSM,OLDAD
      COMMON/BLK6/ FAV,LARGEA
      COMMON/BLK7/ LADDR,RSLINK,SDUM
      COMMON/BLK8/ PBIN,QMAX,QV,QH
      COMMON/BLK11/ GOODQ
      COMMON/BLK12/ BUMP
      COMMON/BLK13/ UNIT,BUFF,NUMWDS,RECCNT,BLKCNT,GETMOD
      COMMON/BLK14/ RCONV,BCONV,DRCONV
      COMMON/BLK15/HDG,VEL
      DATA SUM/128*0/,SUMIN/0/,SUMOUT/0/
      SSDUM=0
      RSMAX=IFIX(RMAX/RSLEN+0.999)
      GETMOD=2
      NUMWDS=0
C
C   FIND NEW CENTROID DATA
C
20    CALL GETDAT
      IF(NUMWDS.GT.0) GO TO 25
      WRITE(5,*) 'FILE PROBLEM--RUN NOT COMPLETED'
      WRITE(5,*) 'ERROR CODE = ',NUMWDS
      GO TO 60
25    IF(NUMWDS.NE.14) GO TO 20
      FAV=FAV+1
      IF(FAV.GT.LARGEA) FAV=1
      IF(BUFF(4).LE.MAXSGN) GO TO 30
      GO TO 50
C
C   STORE CONTACT CENTROID DATA
C
30    BMSM(FAV)=BUFF(7)
      BCOI=BMSM(FAV)*BCONV
      RMSM(FAV)=BUFF(6)
      RCOI=RMSM(FAV)*RCONV
      IF(RCOI.LE.RMAX) GO TO 35
      FAV=FAV-1
GO TO 20
35    SCOI=(BUFF(4).AND.7) +1
      IF(SCOI.GT.8) SCOI=SCOI-8
      SMSM(FAV)=SCOI
C
C FIND RANGE SECTOR, STORE MSM LINK, UPDATE RANGE SECTOR LINK
C
      RSLINK(1)=IFIX(RCOI/RSLEN) + 1
      LMSM(FAV)=LADDR(RSLINK(1))
      LADDR(RSLINK(1))= FAV
C
C  TEST TO STORE OLDEST ADDRESS FOR THE SCAN
C   DETERMINE IF THERE IS A MEMORY OVERFLOW
C   IF THERE IS THEN ONLY LOOK BACK (7-BUMP) SCANS
C
      DUM=SCOI+1+BUMP
      IF(DUM.GT.O) DUM=DUM-O
      IF(FAV.EQ.OLDAD(DUM)) BUMP=BUMP+1
      IF(BUFF(4).LE.SSDUM) GO TO 40
      SSDUM=BUFF(4)
      WRITE(5,*) 'SCAN NUMBER ', BUFF(4)
      IF(BUMP.GT.0)BUMP=BUMP-1
      SDUM-SCOI
      OLDAD(SDUM)=FAV
C
C   FIND ADJACENT RANGE SECTOR
C
```

```
40  DUM=RSLINK(1)-1
    IF(ABS)RCOI/RSLEN - FLOAT(DUM)).GT.0 0.5) DUM=DUM+2
    IF((DUM.EQ.OR.(DUM.GT.RSMAX))DUM=0
    RSLINK(2)=DUM
    SUMIN=SUMIN+1
C
C   CALL LINKER TO GO THROUGH THE LINKED LIST
C
    CALL LINKER
C
C   EVALUATE THE HIGHEST QUALITY PROFILE FOUND
C
    IF(QMAX.LT.GOODQ) GO TO 45
C
C   REPORT THIS CONTACT AND UPDATE STATISTICS
C
    WRITE(3,41)BCOI,RCOI,QMAX,QV,VEL,QH,HDG,(7-BUMP),BUFF(4)
41  FORMAT (T2,F8.3,1X,F9.5,I4,2(1X,I3,1X,F9.4),I3,1X,I4)
    SUM(QMAX+1)=SUM(QMAX+1)+1
    SUMOUT=SUMOUT+1
45  NUMWDS=14
C
C   GO BACK AND READ THE NEXT CONTACT IN FOR PROCESSING
C
    GO TO 20
C
C   PROGRAM IS FINISHED
C
50  WRITE(5,*) 'NORMAL COMPLETION OF DATA FILTERING'
    WRITE(4,51) SUMIN, SUMOUT
51  FORMAT(T2,I5,1X,I5)
    WRITE(4,52) (I,SUM(I+1),I=GOODQ,128)
52  FORMAT(T2,I3,1X,I4)
60  RETURN
    END
C   SUBROUTINE FOR GOING THROUGH THE LINK LISTING
C   TO FIND SUITABLE OLD CONTACTS FOR PROCESSING
C
C   THIS SUBROUTINE IS IN THE FILE RDPLINK.FTN
C
    IMPLICIT INTEGER (A-Z)
    REAL SRATE,VMAX,RMAX,DRMAX,BCOI,RCOI,BOLD,ROLD,DB,DR
    REAL RCONV,BCONV,BRCONV,DBMAX,RSLEN
    REAL BRES,RRES,DRMAX2
    INTEGER BMSM(2048),RMSM(2048),SMSM(2048),LMSM(2048),OLDAD(8)
    INTEGER LADDR(64),RSLINK(2),PBIN(36,100)
    COMMON/BLK1/ SRATE,VMAX,RMAX,DRMAX
    COMMON/BLK2/RMASK,BMASK,MAXSCN,RSLEN
    COMMON/BLK4/ BCOI,RCOI,BOLD,ROLD,DB,DR,SCOI,DS
    COMMON/BLK5/ BMSM,RMSM,SMSM,LMSM,OLDAD
    COMMON/BLK6/ FAV,LARGEA
    COMMON/BLK7/ LADDR,RSLINK,SDUM
    COMMON/BLK8/ PBIN,QMAX,QV,QH
    COMMON/BLK12/ BUMP
    COMMON/BLK14/ RCONV,BCONV,DRCONV
    COMMON/BLK17/ BRES,RRES,MODE,VINDC
C
C   CLEAR THE PROFILE BINS AND THE POINTERS
C
    DO 20 I=I,36
    DO 10 J=1,64
    PBIN(I,J)= 0
10  CONTINUE
20  CONTINUE
    QMAX=0
    QV=0
    QH=0
    SNUM=SCOI+1+BUMP
```

```
          IF(SNUM.GT.8) SNUM=SNUM-8
          OLD=OLDAD(SNUM)
C
C    BEGIN THE LINKING FOR FINDING OLD CONTACTS
C
       DO 50 I=1,2
C
C    I=1  BEGIN SEARCH IN CONTACT'S RANGE SECTOR
C    I=2  BEGIN SEARCH IN ADJACENT RANGE SECTOR
C
          IF(RSLINK(I).EQ.0) GO TO 50
          LINK=LADDR(RSLINK(I))
30        LINK=LMSM(LINK)
          IF9LINK.EQ.0 GO TO 50
          DS=7.AND.(SCOI-SMSM(LINK))
          IF(DS.EQ.0) GO TO 30
C
C    CHECK VALIDITY OF LINK ADDRESS
C
       IF((FAV.LT.OLD).AND.((LINK.LT.FAV).OR.(LINK.GE.OLD))) GO TO 40
C
       IF((FAV.GE.OLD).AND.(LINK.LT.FAV).AND.(LINK.GE.OLD)) GO TO 40
       GO TO 50
C
C  FIND DRMAX AND DBMAX FOR DS SCANS
C
40     DRMAX2=DRMAX*DSV+RRES
       DBMAX=ATAN2(DRMAX2,SQRT(ABS(RCOI**2-DRMAX2**2)))/DRCONV+BRES
       IF(DRMAX2.GT.RCOI) DBMAX-360.
       ROLD=RCONV*FLOAT(RMSM(LINK))

DR=RCOI-ROLD
             IF(ABS(DR).GT.DRMAX2) GO TO 30
             BOLD=BCONV*FLOAT(BMSM(LINK))
             DB=BCOI-BOLD
             IF(ABS(DB).GT.180.0) DB=DB-SIGN(360.0,DB)
             IF(ABS(DB).GT.DBMAX) GO TO 30
C
C      IF A GOOD OLD CONTACT IS FOUND GO AND UPDATE THE PROFILE
C
             CALL PROFIL
             GO TO 30
50           CONTINUE
             RETURN
             END
C
C    SUBROUTINE TO UPDATE AND DECODE THE PROFILE BINS
C
       IMPLICIT INTEGER (A-Z)
       REAL SRATE,VMAX,RMAX,DRMAX,VWIDTH,HWIDTH
       REAL BCOI,RCOI,BOLD,ROLD,DB,DR,VEL,HDG,HDNG,V1,V2,H
       REAL BRES,RRES
       REAL DH,DHLO,DHHI
       INTEGER PBIN(36,100),QDCODE(128)
       INTEGER HINDX(2)
       COMMON/BLK1/ SRATE,VMAX,RMAX,DRMAX
       COMMON/BLK3/ VWIDTH,HWIDTH,HCALC
       COMMON/BLK4/ BCOI,RCOI,BOLD,ROLD,DB,DR,SCOI,DS
       COMMON/BLK8/ PBIN,QMAX,QV,QH
       COMMON/BLK9/ QDCODE
       COMMON/BLK15/HDG,VEL
       COMMON/BLK16/ VMIN
       COMMON/BLK17/ BRES,RRES,MODE,VINDC
       COMMON/BLK18/ HMAX,DHLO,DHHI
       DATA HINDX/1,-1/
       IF(MODE.EQ.1) GO TO 5
C
C    DETERMINE HEADING BINS TO BE UPDATED
```

```
C
      HINDX(2)=-1
      H=HDNG(HCALC)
      JJ=0
      HINDX(1)=IFIX(H/HWIDTH)+1
      DR=ABS(DR)
      DH=FLOAT(HINDX(1))*HWIDTH-H
      IF(DH.GT.DHLO) GO TO 1
      HINDX(2)-HINDX(1)+1
      JJ=1
      IF(HINDX(2).GT.HMAX) HINDX(2)=1
      GO TO 4
1     IF(DH.LT.DHHI) GO TO 4
      HINDX(2)-HINDX(1)-1
      JJ=2
      IF(HINDX(2).EQ HINDX(2)=HMAX
4     IF(HINDX(2).EQ WRITE(5,*) JJ
5     BPAT=2**(DS-1)
C
C DETERMINE VELOCITY BINS TO BE UPDATED
C
      V1=(DR-RRES)/(DS*SRATE)*3600.
      V2=(DR+RRES)/(DS*SRATE)*3600.
      IF(V1.LT.VMIN) V1=VMIN
      IF(V2.GT.VMAX) V2=VMAX
      I=IFIX(VI/VWIDTH)+VINDC
      J=IFIX(VS/VWIDTH)+VINDC
C
C UPDATE PROFILE BINS
C
      DO 20 K=1,2

IF(HINDX(K).EQ.-1) GO TO 20
      DO 10 VINDX=I,J
      IF(PBIN(HINDX(K),VINDX).GE.BPAT) GO TO 10
      PBIN(HINDX(K),VINDX)=PBIN(HINDX(K),VINDX)+BPAT
      QDUM=QDCODE(PBIN(HINDX(K),VINDX)+1)
C
C SEE IF THIS IS THE HIGHEST PROFILE TO DATE
C
      IF(QMAX.GE.DUM) GO TO 10

QMAX=QDUM
   QV=VINDX
   VEL=(V1+V2)/2.
   QH=HINDX(K)
   IF(QH.EQ.0) WRITE(5,*) QH,K
   HDG=H
10 CONTINUE
20 CONTINUE
   RETURN
   END
      REAL FUNCTION HDNG(HCALC)
C
C SUBROUTINE TO DETERMINE THE HEADING ANGLE
C
C THIS SUBROUTINE IS IN FILE RDPHDNG.FTN

IMPLICIT INTEGER (A-Z)
      REAL BCOI,RCOI,BOLD,ROLD,DB,DR,RCONV,BCONV,DRCONV
      REAL LDB,LDR,LR,HDUM,BC,BO,DH,DX,DY
      REAL XCOI,YCOI,XOLD,YOLD,Y
      COMMON/BLK4/ BCOI,RCOI,BOLD,ROLD,DB,DR,SCOI,DS
      COMMON/BLK14 RCONV,BCONV,DRCONV
      Y=0
      IF(HCALC.EQ.2) GO TO 10
C METHOD 1 -- DELTA BEARING, DELTA RANGE
      IF(DB.NE. 0.0) GO TO 1
```

```
              LDB=-10.
              GO TO 2
      1       LDB=ALOG10(ABS(DB*DRCONV)
      2       IF(DR.NE.0.0) GO TO 3
              LDR=-10.
              GO TO 4
      3       LDR=ALOG10(ABS(DR))
      4       LR=ALOG10(RCOI)
              HDUM=10.**(LDB+LR-LDR)
              DH=ATAN(HDUM)/DRCONV
              IF(DR.LT. 0.0) Y=180.
              IF((DB.GE. 0.0.).XOR.(DR.GE. 0.0.)) DH=-DH
              HDUM=BOLD+Y+DH
              IF(HDUM.GT.360.0) HDUM=HDUM-360.0
              IF(HDUM.LT.0.0) HDUM=HDUM+360.0
              GO TO 20
C     METHOD 2 -- DELTA X, DELTA Y
      10      BC=BCOI*DRCONV
              BO=BOLD*DRCONV
              XCOI=RCOI*SIN(BC)
              YCOI=RCOI*COS(BC)
              XOLD=ROLD*SIN(BO)
              YOLD=ROLD*COS(BO)
              DX=XCOI-XOLD
              DY=YCOI-YOLD
              IF(DY.LT. 0.0) Y=180.0
              IF(DX.LT.0.0).AND.(DY.GE. 0.0.)) Y=360.0
              IF(DY.NE.0.0) HDUM=ATAN(DX/DY)/DRCONV
              IF(DY.EQ.0.0) HDUM=SIGN(90.,DX)
              HDUM=HDUM+Y
      20      HDNG=HDUM
              RETURN
              END

C     SUBROUTINE TO GET CENTROID DATA FROM STANDARD FORMAT TAPE
C
C     THIS SUBROUTINE IS IN THE FILE GETDAT.FTN
C
C
C*****************************************************************
C
C     CONNECTING ARGUMENTS FOR THIS SUBROUTNE ARE THROUGH COMMON
C
C*****************************************************************
C
C
C     THIS SUBROUTINE WILL READ A TAPE THEN TRANSFER AN INTERNAL
C     BLOCK OF DATA TO THE OUTPUT BUFFER(BUFF).THE NUMBER OF
C     WORDS TRANSFERRED WILL BE IN (NUMWDS).(RECCNT) WILL BE
C     INCREMENTED EACH TIME A NEW TAPE RECORD IS READ.
C     (BLKCNT) WILL BE INCREMENTED EACH TIME A NEW BLOCK IS
C     FOUND AND TRANSFERRED BACK TO THE CALLING ROUTINE.IT IS
C     RESET TO 1 WHEN A HEADER BLOCK IS FOUND.
C     (GETMOD) CONTROLS THE TYPE OF DATA BLOCKS PASSED BACK TO
C     THE CALLING ROUTINE AS PER INPUT COMMENTS.
C
C     INPUTS: UNIT = LOGICAL UNIT NUMBER
C             BUFF = BUFFER WHERE DATA WILL BE STORED
C             NUMWDS = 0 = INIT/REINIT SOFTWARE (READS 1 REC AND WAIT)
C                    - =    "       "     "            "
C                    + = GET NEXT BLOCK
C             RECCNT = RECORD NUMBER TO START
C             BLKCNT = BLOCK NUMBER LAST OUTPUT
C             GETMOD = BIT 0>RADAR DATA BLOCKS
C                      BIT 1>CENTROID BLOCKS
C                      BIT 2>ENVIRONMENT BLOCKS
C                      SET=1=BLOCKS RETURNED,SET=0=NOT RETURNED
C             NOTE: HEADER BLOCKS WILL ALWAYS BE RETURNED
```

```
C
C
C   OUTPUTS: UNIT   = UNCHANGED
C            BUFF   = OUTPUT DATA STORED HERE
C            NUMWDS = + = NUMBER OF WORDS IN BUFFER
C                   = -3 = HARD ERROR (RESPONSE NECESSARY)
C                   = -2 = EOF
C                   = -1 = EOT
C                   =  0 = SOFT ERROR
C            RECCNT = INCREMENTED IF NECESSARY
C            BLKCNT = BLOCK NUMBER OF THIS OUTPUT
C            GETMOD = UNCHANGED
C
C
C ******NOTE: ERRORS MESSAGES FROM THIS ROUTINE GO TO LOGICAL UNIT 5 *
CCCCCCCCCCCCCCCCCCCCCCCCCCCCCCCCCCCCCCCCCCCCCCCCCCCCCCCCCCCCCCCCC
C
      IMPLICIT INTEGER (A-Z)
C
C*****************************************************************
C             THIS IS CONNECTING ARGUMENT LIST
C
C
      COMMON /BLK13/UNIT,BUFF,NUMWDS,RECCNT,BLKCNT,GETMOD
C
CCCCCCCCCCCCCCCCCCCCCCCCCCCCCCCCCCCCCCCCCCCCCCCCCCCCCCCCCCCCCCCCC
C
C*****************************************************************
C     DIMENSION BUFF(20),STATUS(2,2),PARLST(6,2),INBUF(1024,2)
   DATA RDCODE/O1000/,NUMBUF/2/,SCNERR/0/,SCNPNT/1/
   DATA HDRID/O177400/,RADID/O177000/,CENID/O176400/,ENVID/O176000/
C
C*****************************************************************
C                    PROGRAM START
C
1  CONTINUE
C
C
C TEST IF INITIALIZATION PROCESS IS SELECTED
C
10 IF (NUMWDS.GT.0) GO TO 20
C
C READ ONE RECORD UNDER WAIT CONDITIONS
C
11 I=1
   CALL GETADR(PARLST(1,I),INBUF(1,I))
   PARLST(2,I)=2048
   EVEFLG=1
   CALL WTQIO(RDCODE,UNIT,EVEFLG,PRITY,STATUS(1,I),PARLST(1,I),DRSTA)
   IF(STATUS(1,I).NE.1) TYPE*,STATUS(1,I)-256
   RECCNT=RECCNT+1
   GO TO 22
C
C TEST IF END OF DATA IN THIS DATA BUFFER
C
20 IF(SCNPNT.LT.INBUF(2,I)) GO TO 50
C
C NO MORE DATA,SWITCH BUFFERS AND INCREMENT RECORD COUNTER
C
21 I=I+1
   IF(I.GT.NUMBUF) I=1
   RECCNT=RECENT+1
C
C TEST IF NEW BUFFER IS FINISHED BEING READ,SET HARD ERROR IF NOT
C
C
22 CALL WAITFR(EVEFLG,IDS)
```

```
C
C  TEST IF NEW BUFFER READ HAD ANY HARD ERROR
C
24 IF(STATUS(1,I).EQ.1).OR.(STATUS(1,I).EQ.243)) GO TO 30
C
C  NEW READ HAD A HARD ERROR,SET UP RETURN CODE WITH TYPE
C
25 NUMWDS=-3
   IF(STATUS(1,I).EQ.246) NUMWDS=-2
   IF(STATUS(1,I).EQ.194) NUMWDS=-1
   GO TO 100

C
C***********************************************************************
C
C  AT THIS POINT A GOOD RECORD READ HAS OCCURED
C
C***********************************************************************
C
C  TEST IF PREVIOUS SOFT SCAN ERROR HAS OCCURED
C
30 IF(SCNERR.EQ.0) GO TO 40
C
C  PREV ERROR OCCURED,OUTPUT RECOVERY MESSAGE
C
31 WRITE(5.1000)
C
C     SET UP FOR NEXT DATA BUFFER READ PROCESS
C
40    J=I+1
      IF(J.GT.NUMBUF) J=1
C
C     START NO WAIT READ FOR NEXT BUFFER INPUT
C
41    CALL GETADR(PARLST(1,J),INBUF(1,J))
      PARLST(2,J)=2040
      EVEFLG=1
      CALL QIO(RDCODE,UNIT,EVEFLG,PRITY,STATUS(1,J),PARLST(1,J),DRSTA)
C
C     RESET SCAN DATA POINTER
C
42    SCNPNT=1
C
C     TEST IF NUMBER OF WORDS IN THIS RECORD IS VALID,RESET IF NOT
C
43    IF(INBUF(2,I).GT.(STATUS(2,I)/2)) INBUF(2,I)=STATUS(2,I)/2
      IF(INBUF(2,I).LT.13) INBUF(2,I)=STATUS(2,I)/2
C
C     TEST IF NUMBER OF WORDS TO PROCESS IN THIS RECORD IS > 12
C
44    IF(INBUF(2,I).GT.12) GO TO 50
C
C     SET UP FOR SOFT ERROR,SET SCAN COUNTER FOR FUTURE FAILURE
C
45    NUMWDS=0
      SCNPNT=10000
      GO TO 100
C
C***********************************************************************
C
C     SCAN THIS DATA BUFFER FOR VALID ID TYPES
C
C***********************************************************************
C
C     TEST IF TIME TO READ HEADER BLOCK ONLY
C
50    WORD1=INBUF(SCNPNT,I)
      IF(SCNPNT.GT.12) GO TO 52
```

```
C
C       TEST IF HEADER TYPE BLOCK, SET TO OUTPUT IF SO ELSE ERROR
C
51      IF(WORD1.NE.HDRID) GO TO 75
        SYNC1=INBUF(SCNPNT+4,I)
        NUMWDS=12
        BLKCNT=0
        GO TO 80
C
C       TEST IF THIS BLOCKS TIME=CLOSE TO HEADERS (SYNC WORD)
C
52      IF(IABS(INBUF(SCNPNT+1,I)-SYNC1).GT.2) GO TO 75
C
C       TEST IF RADAR DATA TYPE BLOCK,SET UP TO OUTPUT IF SO AND REQUESTED
C
55      IF(WORD1.NE.RADID) GO TO 60
        NUMWDS=12
        IF((GETMOD.AND.1).NE.0) GO TO 80
        GO TO 70
C
C       TEST IF CENT TYPE DATA BLOCK,SET UP TO OUTPUT IF SO AND REQUESTED
C
60      IF(WORD1.NE.CENID) GO TO 65
        NUMWDS=14
        IF((GETMOD.AND.2).NE.0) GO TO 80
        GO TO 70
C
C       TEST IF ENVIRONMENT TYPE BLOCK ID
C
65      IF(WORD1.NE.ENVID) GO TO 75
C
C
C       SCAN INPUT BUFFER FOR NEXT VALID ID TYPE WORD WITHIN RECORD
C
66      DO 67 NUMWDS=5,134
        IF(SCNPNT+NUMWDS.GT.INBUF(2,I)) GO TO 68
        SCNWRD=INBUF(SCNPNT+NUMWDS,I)
        IF((SCNWRD.EQ.HDRID) .OR.
       1    (SCNWRD.EQ.RADID) .OR.
       2    (SCNWRD.EQ.CENID) .OR.
       3    (SCNWRD.EQ.ENVID)) GO TO 68
67      CONTINUE
        GO TO 75
C       SET TO OUTPUT IF VALID ID IS FOUND AND OUTPUT IS REQUESTED
C
60      IF((GETMOD.AND.4).NE.0) GO TO 80
        GO TO 70
C
C       TEST IF PREV SYNC ERROR OCCURED
C
70      IF(SCNERR.EQ.0) GO TO 72
C
C       PREV ERROR OCCURED OUTPUT MSG INDICATING RESYNC
C
71      WRITE (5,1002) SCNPNT
        SCNERR=0
C
C
C       SET SCAN POINTER TO NEXT POSITION
C
72      SCNPNT=SCNPNT+NUMWDS
        BLKCNT=BLKCNT+1
        GO TO 20
C
C       SCAN ERROR HAS OCCURED,OUTPUT MSG TO NOTIFY
C
75      IF(SCNERR.NE.0) GO TO 76
        SCNERR=SCNPNT
        WRITE(5,1001) RECCNT,SCNPNT
```

```
C
C     TEST IF ERROR IN HEADER,SET SCAN COUNTER FOR ERROR
C
76    IF(SCNPNT.LT.12) SCNPNT=10000
C
C     INCREMENT POINTER BY 1 EACH TIME TILL RESYNC TAKES PLACE
C
77    SCNPNT=SCNPNT+1
C
C     TEST IF AT END OF INPUT DATA,RETURN WITH SOFT ERROR IF SO
C
78    IF(SCNPNT,LT.INBUF(2,I)) GO TO 50
      NUMWDS=-4
      GO TO 100
C
C     TEST IF PREV SYNC ERROR OCCURED
C
80    IF(SCNERR.EQ.0) GO TO 90
C
C     PREV ERROR OCCURED OUTPUT MSG INDICATING RESYNC
C
81    WRITE(5,10002) SCNPNT
      SCNERR=0
C
C     TRANSFER DATA TO OUTPUT BUFFER FOR EXTERNAL USE
C
90    SCNPNT=SCNPNT-1
      00 91 J=1,NUMWDS
      BUFF(J)=INBUF(SCNPNT+J,I)
91    CONTINUE
C
C     SET SCAN POINTER TO POSITION OF NEXT VALID ID
C
92    SCNPNT=SCNPNT+NUMWDS+1
      BLKCNT=BLKCNT+1
C
C
C     RETURN TO CALLING ROUTINE
C
100   RETURN
C
C
C     ALL FORMAT STATEMENTS STORED HERE
C
C
1000  FORMAT(2X,'RESYNC NOT FOUND IN LAST RECORD.')
1001  FORMAT(2X,'SYNC ERROR OCCURED IN RECORD#',I4,' AT WORD #',I4,'.')
1002  FORMAT(2X,'RESYNC FOUND AT WORD #',I4,'.')
      END

BLOCK DATA
C
C     SUBROUTINE TO INITIALIZE VARIABLES IN THE COMMON BLOCKS
C
C     THIS IS FOUND IN THE FILE RDPBDAT.FTN
C
      IMPLICIT INTEGER (A-Z)
      INTEGER BMSM(2048),RMSM(2048),SMSM(2048),LMSM(2048),OLDAD(8)
      INTEGER LADDR (64),RSLINK(2),QDCODE(128)
      REAL RCONV,BCONV,DRCONV
      REAL HWDITH,VWIDTH
      COMMON/BLK5/  BMSM,RMSM,SMSM,LMSM,OLDAD
      COMMON/BLK6/  FAV,LARGEA
      COMMON/BLK7/  LADDR,RSLINK,SDUM
      COMMON/BLK9/  QDCODE
      COMMON/BLK11/ DONE
      COMMON/BLK12/ BUMP
      COMMON/BLK14/ RCONV,BCONV,DRCONV
```

```
      COMMON/BLK3/ HWIDTH,VWIDTH,HCALC
      DATA SDUM/0/,FAV/0/,LARGEA/2048/,DONE/0/
      DATA LADDR/64*0/,OLDAD/8*0/,BUMP/0/
      DATA QDCODE/
     + 0,7,6,28,5,27,24,63,4,26,21,62,
     + 19,60,53,98,3,25,20,61,16,57,50,97,
     + 14,55,46,95,41,91,83,119,2,23,18,59,
     + 15,56,47,96,12,52,43,93,38,88,79,118,
     + 10,49,40,90,35,85,76,116,33,82,73,114,
     + 69,110,105,126,1,22,17,58,13,54,45,94,
     + 11,51,42,92,37,87,78,117,9,48,39,89,
     + 34,84,75,115,31,80,71,112,68,109,104,125,
     + 8,44,36,86,32,81,72,113,30,77,70,111,
     + 66,107,102,124,29,74,67,108,65,106,101,123,
     + 64,103,100,122,99,121,120,127/
      DATA RCONV/.0078125/,BCONV/.0439453125/
C     PMTC RCONV IS 8.1967209E-3
C     STANDARD FORMAT RCONV IS .0078125
      END
``` the velocity of a possible target detected at both the contact of interest and the particular compared contact; and velocity limiter means for (a) comparing each derived velocity number output from the encoder means with a predefined velocity maximum number ($V_{max}$) and a predefined minimum velocity number ($V_{min}$), $V_{min}$ and $V_{max}$ bracketing the likely velocities of a target, and (b) rejecting as an indicator of the probable presence of a target each contact within, when compared to the contact of interest, provides an encoded velocity number that is either less than $V_{min}$ or more than $V_{max}$.

2. A retrospective data filter as in claim 1 further comprising:

sectoring means for identifying a defined sector in which the contact of interest was detected; and index register means, having the sectoring means output as an input, for addressing in the multiscan memory the position data relating to the contact (i) most recent in time relative to and (ii) in the same sector as the contact of interest.

3. A retrospective data filter as in claim 2 wherein the multiscan memory has (a) addressable locations, each location containing position data associated with a respective contact detected prior to the detection of the contact of interest and (b) a linking address allocated to the position data associated with each such prior contact, the linking address associated with a particular contact pointing to the location of the position data of the contact which is (i) most recent in time relative to and (ii) in the same sector as the particular contact.

4. A retrospective data filter as in claim 3 wherein the index register means and the multiscan memory comprise link chain means for linking the position data of the contact of interest to the position data of each previous contact in the same position sector as the contact of interest by linking the position data of one such contact to another in reverse chronological order.

5. A retrospective data filter as in claim 4 wherein the link chain means effects a reverse chronological outputting of position data from the multiscan memory.

6. A retrospective data filter as in claim 5 further comprising:

means for determining when the contact of interest has been compared in the comparator means with all previous contacts in the same sector as the contact of interest; and adjacent sector comparator means for comparing the position data of the contact of interest with the position data of each contact detected (a) in at least one adjacent position sector relative to and (b) during a scan prior to that of the detection of the contact of interest; and adjacent sector encoder means for deriving, based on (a) the comparisons made in the adjacent sector comparator means and (b) the relative detection times of the contact of interest and each particular compared contact in the adjacent sector, a corresponding velocity number which is indicative of the velocity of a posible target moving through the contact of interest and the particular compared contact in the adjacent sector.

7. A retrospective data filter as in claim 5 further comprising:

a scan counter which assigns a scan number to the position data associated with the contact of interest and each contact in at least one previous scan; and subtractor means for determining a $\Delta S$ value by subtracting (a) the scan number assigned to position data being output from the multiscan memory at a given time from (b) the scan number assigned to position data of the contact of interest, the $\Delta S$ value indicating the number of scans between the contact of interest and the contact the position data of which is being outputted from the multiscan memory.

8. A retrospective data filter as in claim 7 further comprising:

link test means for determining if position data being output from the multiscan memory is valid.

9. A retrospective data filter as in claim 8 wherein the link test means comprises:

means for determining a last valid scan number (LVSN) for the contact of interest;

register means for storing the oldest valid address in which position data relating to the current contact of interest is located; and means for comparing the linking address scan number (SN) associated with the position data being output from the multiscan memory with the oldest valid scan number (OLD) and the last valid scan number (LVSN) and for declaring the linking address (LINK) valid only if $OLD \leq SN \leq LVSN$ and $LINK > 0$.

10. A retrospective data filter as in claim 1 further comprising:
   means for adapting the multiscan memory to store and output position data corresponding to contacts detected during a varying number of scans, the number of scans being a function of the number of contacts detected during the scans.

11. A retrospective data filter as in claim 9 further comprising:
   means for adapting the multiscan memory to store and output position data corresponding to contacts detected during a varying number of scans, the number of scans being a function of the number of contacts detected during the scans.

12. A retrospective data filter as in claim 11 further comprising:
   means, associated with the comparator means, for determining a positional difference between the contact of interest and the particular compared contact based on the position data thereof; and
   limiter means for (a) comparing the positional difference to a predefined maximum and (b) rejecting as an indicator of the probable presence of a target each contact which, when compared to the contact of interest, provides a positional difference which exceeds the predefined maximum.

13. A retrospective data filter as in claim 7 further comprising:
   means, connected to the encoder means, for limiting encoding to pairwise comparisons wherein the $\Delta S$ value is not zero; and
   means for providing a reject signal when the $\Delta S$ value equals zero.

14. A retrospective data filter as in claim 1 further comprising:
   profiler means for generating at least one multi-bit profile word, each profile word indicating during which scans prior to the contact of interest scan a contact was detected which, upon comparison with the contact of interest, yields, from the encoding means one of a set of selected velocity numbers defining a given band of target velocities.

15. A retrospective data filter as in claim 14 wherein (a) each bit in a particular profile word relates to a corresponding scan and (b) each bit therein has a first state for indicating the presence of and a second state for indicating the absence of a contact (i) detected during the corresponding scan and (ii) having a velocity number associated with the particular profile word.

16. A retrospective data filter as in claim 15 wherein the order of bits in each profile word is the same as the chronology of the corresponding scans.

17. A retrospective data filter as in claim 7 further comprising:
   profiler means for generating at least one multi-bit profile word, each profile word indicating during which scans prior to the contact of interest scan a contact was detected which, upon comparison with the contact of interest, yields one of a set of selected velocity numbers wherein the set comprises at least one velocity number and which defines a given band of target velocities;
   wherein (a) each bit in a particular profile word relates to a corresponding scan and (b) each bit therein has a first state for indicating the presence of and a second state for indicating the absence of a contact (i) detected during the corresponding scan and (ii) having a velocity number associated with the particular profile word; and
   wherein the profiler means comprises:
      a buffer which (a) stores each of the profile words therein and (b) has an address input which receives velocity number outputs from the encoder means; and
      profile update logic which receives as input the $\Delta S$ value exitting the scan number subtractor;
   wherein the velocity number entering the address input of the buffer directs the profile word, associated with such velocity number into the profile update logic, the $\Delta S$ value entering the profile update logic indicating which bit in the profile word is to be in the first state, such bit being switched to the first state by the profile update logic if not already in the first state, thereby updating the particular profile word.

18. A retrospective data filter as in claim 17 wherein the buffer comprises a plurality of memories alternately accessed with each successive velocity number input, a profile word to be updated being enterable into the profile update logic from one memory while an updated profile word may, at the same time, exit the profile update logic and enter another memory.

19. A retrospective data filter as in claim 5 further comprising:
   profiler means, for generating at least one multi-bit profile word, each profile word indicating in which prior scans a contact was detected which, upon comparison with the contact of interest, yields from the encoding means one set of selected velocity numbers which define a given band of target velocities.

20. A retrospective data filter as in claim 19 further comprising:
   quality encoding means, having the profiler means output as input, for assigning a relative quality value to each profile word relating to the contact of interest, each relative quality value indicating a relative probability that the associated profile word represents a target.

21. A retrospective data filter as in claim 15 further comprising:
   quality encoding means, having the profiler means output as input, for assigning a relative quality value to each profile word relating to the contact of interest, each relative quality value indicating a relative probability that the associated profile word represents a target.

22. A retrospective data filter as in claim 21 wherein the quality encoding means comprises means for counting the number of bits in the first state in a particular profile word.

23. A retrospective data filter as in claim 21 wherein the quality encoding means comprises means for determining the relative quality value in accordance with the pattern of bits in the first state in a particular profile word.

24. A retrospective data filter as in claim 21 further comprising:
   thresholding means, having a false alarm rate input thereto, for comparing the assigned relative quality value to the false alarm rate input.

25. A retrospective data filter as in claim 24 wherein the thresholding means is adjustable, the false alarm rate input being variable.

26. A retrospective data filter as in claim 23 further comprising:
highest quality comparator means for comparing (a) the relative quality value assigned to a profile word with (b) the highest relative quality value assigned to any previous profile word relating to the contact of interest.

27. A retrospective data filter as in claim 26 wherein the highest quality comparator means comprises:
latching means for updating the highest quality value each time the profiler means directs an input to the quality encoding means.

28. A retrospective data filter as in claim 26 further comprising:
an output interface for providing as output the velocity number of the profile word having the highest quality.

29. A retrospective data filter as in claim 6 wherein the output interface further provides as output the profile word having the highest relative quality value and the relative quality value thereof.

30. In a scanning radar system, apparatus for detecting targets, within a predetermined probability, based on detected contacts some, but not necessarily all of which, represent the presence of a target, the apparatus comprising:

means for entering position data for a contact of interest;

means for identifying the one of a plurality of position sectors in which the entered contact of interest is detected;

means for ordering position data corresponding to contacts detected prior to the detection of the entered contact of interest according to the identified sector in which each such contact was detected;

linking means for linking the position data of each data contact, including the entered contact of interest, to the position of the most recent previous contact, if any, detected in the same sector; and aligning means for determining which linked contacts in the same identified sector as the entered contact of interest are aligned with the entered contact of interest as to represent the velocity of a probable target; and velocity limiter means for (a) comparing each derived velocity output from the aligning means with a predefined velocity maximum number ($V_{max}$) and a predefined minimum velocity number ($V_{min}$), $V_{min}$ and $V_{max}$ bracketing the likely velocities of a target, and (b) rejecting as an indicator of the probable presence of a target each contact which, when compared to the contact of interest, provides an encoded velocity output that is either less than $V_{min}$ or more than $V_{max}$.

31. Apparatus as in claim 7 wherein the linking means comprises:
a multiscan memory comprising a plurality of sequential addresses, position data and a link address associated with one detected contact being storable at each address, a link address stored at each such address pointing to another address at which position data for another contact detected during a prescribed earlier time and in the same sector, if such a contact exists, is stored.

32. Apparatus as in claim 8 wherein the linking means further comprises:
a table which, for each sector, stores the last address and scan number at which position data for each sector is stored, the last address being directed from the table to the multiscan memory as a link address assigned to a contact of interest in the sector where position data for such contact of interest is entered and provided as an address in the multiscan memory;

wherein the last address and scan number stored in the table for each sector is updated for successive entered contacts of interest, the address and scan number relating to the most recent previous contact of interest in the sector representing the link address assigned to a current entered contact of interest.

33. A method for filtering position data relating to contacts detected by a scanning target detection system, the method comprising the steps of:
entering one set of position data after another into a multiscan memory;

identifying the position sector in which the contact corresponding to each set of position data is detected;

linking each set of entered position data to the most recent previous set of entered position data identified with the same position sector, wherein the linking comprises the step of:
generating at least one link chain, each chain linking a set of position data to previous sets of position data in a particular identified sector over a period of time;

comparing the position and timing of a particular set of position data in one particular sector to each other previous set of position data in the particular corresponding chain and defining a velocity relative to each such comparison; and comparing each defined velocity with a predefined maximum velocity number ($V_{max}$) and a predefined minimum velocity number ($V_{min}$), $V_{min}$ and $V_{max}$;

bracketing the likely velocities of target;

rejecting as an indicator of a probable presence of a target each contact which, when compared to the contact of interest, provide an encoded velocity number that is either less than $V_{min}$ or more than $V_{max}$.

34. A method for filtering position data relating to contacts detected by a scanning target detection system, as in claim 33, comprising the further step of:
defining velocity profiles relative to one set of position data, based on the comparisons between the one set and the previous sets of position data, the defining of one velocity profile comprising the step of determining which previous sets of position data when compared with the one set of position data indicate a target moving with a velocity within a given velocity band.

35. A method for filtering position data relating to contacts detected by a scanning target detection system, as in claim 34, comprising the further step of:
determining if the linking is valid comprising the steps of: (a) storing an oldest valid set of position data relative to the one set of position data and (b) determining that a previous set compared to the one set of position data was not entered after oldest valid set of position data.

36. A method for filtering position data relating to contact detected by a scanning target detection system, as in claim 35 comprising the further step of:
rejecting a previous set of position data when the comparing indicates that (a) the difference in position between the contact corresponding to the previous set and the contact corresponding to the one set of position data exceeds a preset limit, (b) a velocity defined by the previous set and the one set of position data is beyond defined velocity limits, or (c) the previous set and the one set of position data each represent contacts detected during the same scan.

37. A method for filtering position data relating to contacts detected by a scanning target detection system, as in claim 36, comprising, if the linking is valid and the previous set is not rejected, the further step of:
   updating the velocity profile, corresponding to a particular velocity band, as the one set is compared with one previous set of position data after another.

38. A method for filtering position data relating to contact detected by a scanning target detection system, as in claim 37, comprising the further steps of:
   assigning a quality value, indicative of the probability of target presence, to each updated velocity profile; and
   finding and saving the highest quality velocity profile.

39. A method for filtering position data relating to contacts detected by a scanning target detection system, as in claim 38, wherein each velocity profile corresponds to an exclusive velocity band, the method comprising the steps of:
   determining if the velocity defined between the one set and a previous set of position data is near the edge of the velocity band associated with a corresponding velocity profile; and,
   if the velocity is near the edge of two adjacent velocity profiles, redefining the velocity profile to correspond to the velocity band on the other side of the edge.

40. A method for filtering position data relating to contacts detected by a scanning target detection system, as in claim 39, the method comprising the steps of:
   determining if predefined position limits or velocity limits or same scan limits are violated; and
   updating the redefined velocity profile as the one set is compared to previous sets of position data.

41. A method for filtering position data relating to contacts detected by a scanning target detection system, as in claim 40, further comprising the steps of:
   comparing, if the linking is invalid, the one set of position data to each previous set of position data in one adjacent sector after another until all previous sets in one adjacent sector after another have been compared to the one set of position data.

42. A method for filtering position data relating to contacts detected by a scanning target detection system, as in claim 34, further comprising the steps of:
   defining secondary velocity profiles for each adjacent sector;
   entering the link chain relating the one set of position data to the position data of each previous contact in such adjacent sector;
   determining if the linking is valid for each adjacent sector positon data comparison;
   entering the position data of one contact after another in the adjacent sector;
   rejecting an entered adjacent sector previous set of position data if a preestablished position, velocity, or same scan limit is exceeded; and
   updating the adjacent sector velocity profiles as position data is not rejected,
   entering validly linked adjacent sector position data.

43. A method for filtering position data relating to contacts detected by a scanning target detection system, as in claim 42, further comprising the steps of:
   assigning a quality to each updated velocity profile, the quality indicating the probability that a velocity profile corresponds to a target;
   comparing the highest quality velocity profile with a threshold value and indicating a probable detection if the threshold value is exceeded.

44. A retrospective data filter as in claims 1, 5, 7, 14, 20 or 24 wherein the filter comprises a computer model.

45. Apparatus as in claims 30, 31 or 33 wherein the apparatus comprises a computer model.

46. A retrospective data filter as in claim 2, wherein the sectors are identified as a function of range and bearing.

* * * * *